(12) United States Patent
Kojima et al.

(10) Patent No.: US 11,451,403 B2
(45) Date of Patent: Sep. 20, 2022

(54) VERIFICATION METHOD, INFORMATION PROCESSING DEVICE, AND NON-TRANSITORY COMPUTER-READABLE STORAGE MEDIUM FOR STORING VERIFICATION PROGRAM

(71) Applicant: FUJITSU LIMITED, Kawasaki (JP)

(72) Inventors: Rikuhiro Kojima, Kawasaki (JP); Dai Yamamoto, Kawasaki (JP); Tetsuya Izu, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 17/131,685

(22) Filed: Dec. 22, 2020

(65) Prior Publication Data

US 2021/0226801 A1    Jul. 22, 2021

(30) Foreign Application Priority Data

Jan. 20, 2020  (JP) .............................. JP2020-007076

(51) Int. Cl.
*H04L 9/32*      (2006.01)
*H04L 9/06*      (2006.01)

(52) U.S. Cl.
CPC .......... *H04L 9/3252* (2013.01); *H04L 9/0643* (2013.01); *H04L 9/3242* (2013.01)

(58) Field of Classification Search
CPC ... H04L 9/3252; H04L 9/0643; H04L 9/3242; H04L 9/3239; H04L 9/50; H04L 9/3247
See application file for complete search history.

(56) References Cited

U.S. PATENT DOCUMENTS 9,104,687 B2 *   8/2015   Euresti ................. G06F 16/174
11,327,741 B2 *   5/2022   Hatakeyama ........... A63F 13/77
(Continued)

FOREIGN PATENT DOCUMENTS

EP        1808795 A2     7/2007
JP     2004-248045 A     9/2004
(Continued)

OTHER PUBLICATIONS

Syalim, Amril et al., "How to Sign Multiple Versions of Digital Documents", 2017 International Workshop On Big Data and Information Security (IWBIS), IEEE, Sep. 23, 2017, pp. 133-136, XP033308875.

(Continued)

*Primary Examiner* — Mohammed Waliullah
(74) *Attorney, Agent, or Firm* — Fujitsu Patent Center

(57) ABSTRACT

A verification method implemented by a first system including a plurality of computers, the method includes: calculating a first hash value for an original document; calculating a second hash value for an original document by using the first hash value; calculating a first modified version's first hash value for the first modified version document; calculating a first modified version's second hash value that is a hash value obtained by combining the first modified version's first hash value and the original document's second hash value; in response to a second modified version document obtained by modifying the first modified version document, calculating a second modified version's first hash value for the second modified version document; and calculating a second modified version's second hash value that is a hash value obtained by combining the second modified version's first hash value and the first modified version's second hash value.

11 Claims, 29 Drawing Sheets

(56) References Cited

U.S. PATENT DOCUMENTS

| | | |
|---|---|---|
| 2005/0235154 A1 | 10/2005 | Serret-Avila |
| 2007/0050713 A1 | 3/2007 | Yoshioka et al. |
| 2007/0168672 A1 | 7/2007 | Izu et al. |
| 2009/0193256 A1* | 7/2009 | Takenaka ............... H04L 9/302 |
| | | 713/176 |
| 2011/0072278 A1* | 3/2011 | Izu ......................... G06F 21/64 |
| | | 713/193 |
| 2014/0298034 A1 | 10/2014 | Watanabe et al. |

FOREIGN PATENT DOCUMENTS

| | | | |
|---|---|---|---|
| JP | 2007-213549 A | | 8/2007 |
| JP | 2011-244321 A | | 12/2011 |
| JP | 2017-163326 A | | 9/2017 |
| KR | 20180078068 A | * | 7/2018 |
| WO | 2006/008847 A1 | | 1/2006 |

OTHER PUBLICATIONS

Extended European Search Report dated Jun. 4, 2021 for corresponding European Patent Application No. 20214569.4, 5 pages.
Masazumi Matsubara et al., "Improving Reliability of Data Distribution Across Categories of Business and Industries with Chain Data Lineage", FUJITSU, vol. 70, No. 4, pp. 55-62, Sep. 2019 (55 pages), Corresponding English version of Fujitsu Scientific & Technical Journal, vol. 56, No. 1, pp. 52-59, 2020 (52 pages) (Total 107 pages).

* cited by examiner

| DOCUMENT BLOCK | HASH VALUE | SIGNATURE |
|---|---|---|
| THE SERVICE AGREEMENT IS MADE AND ENTERED INTO AS FOLLOWS. | $h_{11}$ = Hash(THE SERVICE AGREEMENT..., $r_{11}$)<br>$c_{11}$ = Hash($h_{11}$ \|\| seed) | Sign ($c_{11}$, Alice) |
| AN UNPAID AMOUNT SHALL BEAR AN ANNUAL INTEREST RATE OF 5%. | $h_{12}$ = Hash(AN UNPAID AMOUNT SHALL BEAR AN ANNUAL INTEREST RATE OF 5%, $r_{12}$) $c_{12}$ = Hash($h_{12}$ \|\| seed) | Sign ($c_{12}$, Alice) |
| THE TERM OF THE AGREEMENT IS FOR ONE YEAR. | $h_{13}$ = Hash(THE TERM OF THE AGREEMENT IS FOR ONE YEAR, $r_{13}$)<br>$c_{13}$ = Hash($h_{13}$ \|\| seed) | Sign ($c_{13}$, Alice) |
| THE PERSON RESPONSIBLE FOR THE DOCUMENT: ALICE | $h_{14}$ = Hash(THE PERSON RESPONSIBLE FOR THE DOCUMENT: ALICE, $r_{14}$)<br>$c_{14}$ = Hash($h_{14}$ \|\| seed) | Sign ($c_{14}$, Alice) |

⇩

*85*

| DOCUMENT BLOCK | HASH VALUE | SIGNATURE |
|---|---|---|
| THE SERVICE AGREEMENT IS MADE AND ENTERED INTO AS FOLLOWS. | $h_{21}$ = Hash(THE SERVICE AGREEMENT..., $r_{21}$)<br>$c_{21}$ = Hash($h_{21}$ \|\| $c_{11}$) | Sign ($c_{21}$, Carol) |
| AN UNPAID AMOUNT SHALL BEAR AN ANNUAL INTEREST RATE OF 10%. | $h_{22}$ = Hash(AN UNPAID AMOUNT SHALL BEAR AN ANNUAL INTEREST RATE OF 10%, $r_{22}$)<br>$c_{22}$ = Hash($h_{22}$ \|\| $c_{12}$) | Sign ($c_{22}$, Carol) |
| THE TERM OF THE AGREEMENT IS FOR ONE YEAR. | $h_{23}$ = Hash(THE TERM OF THE AGREEMENT IS FOR ONE YEAR, $r_{23}$)<br>$c_{23}$ = Hash($h_{23}$ \|\| $c_{13}$) | Sign ($c_{23}$, Carol) |
| THE PERSON RESPONSIBLE FOR THE DOCUMENT: ALICE THE REVIEWER: CAROL | $h_{24}$ = Hash(THE PERSON RESPONSIBLE FOR THE DOCUMENT: ALICE..., $r_{24}$)<br>$c_{24}$ = Hash($h_{24}$ \|\| $c_{14}$) | Sign ($c_{24}$, Carol) |

⇩

*86*

| DOCUMENT BLOCK | HASH VALUE | SIGNATURE |
|---|---|---|
| THE SERVICE AGREEMENT IS MADE AND ENTERED INTO AS FOLLOWS. | $h_{31}$ = Hash(THE SERVICE AGREEMENT..., $r_{31}$)<br>$c_{31}$ = Hash($h_{31}$ \|\| $c_{21}$) | Sign ($c_{31}$, Charlie) |
| AN UNPAID AMOUNT SHALL BEAR AN ANNUAL INTEREST RATE OF 3%. | $h_{32}$ = Hash(AN UNPAID AMOUNT SHALL BEAR AN ANNUAL INTEREST RATE OF 3%, $r_{32}$)<br>$c_{32}$ = Hash($h_{22}$ \|\| $c_{22}$) | Sign ($c_{32}$, Charlie) |
| THE TERM OF THE AGREEMENT IS FOR SIX MONTHS. | $h_{33}$ = Hash(THE TERM OF THE AGREEMENT IS FOR ONE YEAR, $r_{33}$)<br>$c_{33}$ = Hash($h_{33}$ \|\| $C_{23}$) | Sign ($c_{33}$, Charlie) |
| THE PERSON RESPONSIBLE FOR THE DOCUMENT: ALICE REVIEWERS: CAROL AND CHARLIE | $h_{34}$ = Hash(THE PERSON RESPONSIBLE FOR THE DOCUMENT: ALICE..., $r_{34}$)<br>$c_{34}$ = Hash($h_{34}$ \|\| $C_{24}$) | Sign ($c_{34}$, Charlie) |

FIG. 26

| POSITION OF SIGNATURE OF ALICE | POSITION OF SIGNATURE OF CAROL | POSITION OF SIGNATURE OF CHARLIE | SIGNATURE |
|---|---|---|---|
| $C_{11}$ | $C_{21}$ | $C_{31}$ | Sign ( $C_{11} + C_{21} + C_{31}$, {Alice, Carol, Charlie}) |
| $C_{12}$ | $C_{22}$ | $C_{32}$ | Sign ( $C_{12} + C_{22} + C_{32}$, {Alice, Carol, Charlie}) |
| $C_{13}$ | $C_{23}$ | $C_{33}$ | Sign ( $C_{13} + C_{23} + C_{33}$, {Alice, Carol, Charlie}) |
| $C_{14}$ | $C_{24}$ | $C_{34}$ | Sign ( $C_{14} + C_{24} + C_{34}$, {Alice, Carol, Charlie}) |

AGGREGATION

Sign ( $C_{11} + ... + C_{34}$, {Alice, Carol, Charlie})

VERIFICATION METHOD, INFORMATION PROCESSING DEVICE, AND NON-TRANSITORY COMPUTER-READABLE STORAGE MEDIUM FOR STORING VERIFICATION PROGRAM

CROSS-REFERENCE TO RELATED APPLICATION

This application is based upon and claims the benefit of priority of the prior Japanese Patent Application No. 2020-7076, filed on Jan. 20, 2020, the entire contents of which are incorporated herein by reference.

FIELD

The embodiments discussed herein are related to a verification method, an information processing device, and a non-transitory computer-readable storage medium storing a verification program.

BACKGROUND

One of techniques for signing an electronic document is multi-signature using a plurality of private keys. Multi-signature enables a plurality of signatures affixed to the same document to be aggregated into a single aggregate signature. When a verifier successfully verifies the aggregate signature, the successful verification mathematically indicates that the verifier has verified all the signatures. As a representative method that enables a plurality of signatures to be aggregated, Schnorr multi-signature exists.

As a technique that guarantees the reliability of an electronic document, an electronic document management system has been proposed. The electronic document management system ensures that parts of an electronic document have been appropriately corrected. The electronic document management system enables the validity of the corrected parts to be certified by a third party. Another electronic document management system has been proposed. The electronic document management system enables document information to be certified by a third party using a small amount of stored metadata. A technique (Chain Data Lineage) for improving the reliability of data to be communicated in different industries has been proposed.

Examples of the related art include International Publication Pamphlet No. WO 2006/008847 and Japanese Laid-open Patent Publication No. 2007-213549.

Another example of the related art is "Masazumi Matsubara, Takeshi Miyamae, Akira Ito, and Ken Kamakura, "Improving Reliability of Data Distribution Across Categories of Business and Industries with Chain Data Lineage", FUJITSU, Vol. 70, No. 4, p. 55-62, September 2019".

SUMMARY

According to an aspect of the embodiments, provided is a verification method implemented by a first system including a plurality of computers. In an example, the method includes: in response to an original document, calculating an original document's first hash value by using the original document; in response to the calculating of the first hash value, calculating an original document's second hash value by using the first hash value; in response to obtaining of a first modified version document modified from the original document, calculating a first modified version's first hash by using the first modified version document; in response to the calculating of the first modified version's first hash value, calculating a first modified version's second hash value that is a hash value obtained by combining the first modified version's first hash value and the original document's second hash value; in response to obtaining of a second modified version document by modifying the first modified version document, calculating a second modified version's first hash value that is a hash value for the second modified version document; in response to the calculating of the second modified version's, calculating a second modified version's second hash value that is a hash value obtained by combining the second modified version's first hash value and the first modified version's second hash value; and transmitting information to a second computer system to cause the second computer to verify the validity of the second modified version's second hash value by using the information, the information including the original document's first hash value, the first modified version's first hash value, and the second modified version's first hash value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 25 illustrates an example of information generated by the creator terminal and the reviewer terminals;

FIG. 26 illustrates an example of signature aggregation;

DESCRIPTION OF EMBODIMENT(S)

As a situation in which a technique for aggregating a plurality of signatures by multi-signature is used, for example, a plurality of persons (hereinafter referred to as reviewers) who review a document exist and the review is performed by the plurality of reviewers. In this case, a verifier uses a computer to view all modified version documents and calculate hash values for the modified version documents in order to verify the signatures by multi-signature.

In this case, an organization to which a document creator and the document reviewers belong may be different from an organization to which the verifier belongs. The original document before a modification and a document being modified are information shared only in the organization to which the document creator and the document reviewers belong. It may not be preferable that the information be viewed by the outsider verifier.

However, signatures are affixed to the document every time the reviewers modify the document. When the signatures are aggregated, the existing technique does not enable the verifier to verify that an unauthorized operation, such as the replacement of the signatures, is not performed, without the disclosure of the document being modified to the verifier.

According to an aspect, the present disclosure aims to reliably verify a plurality of signatures without using a document being modified.

Hereinafter, embodiments are described with reference to the drawings. Two or more of the embodiments may be combined and implemented without any contradiction.

First Embodiment

Figure 1:
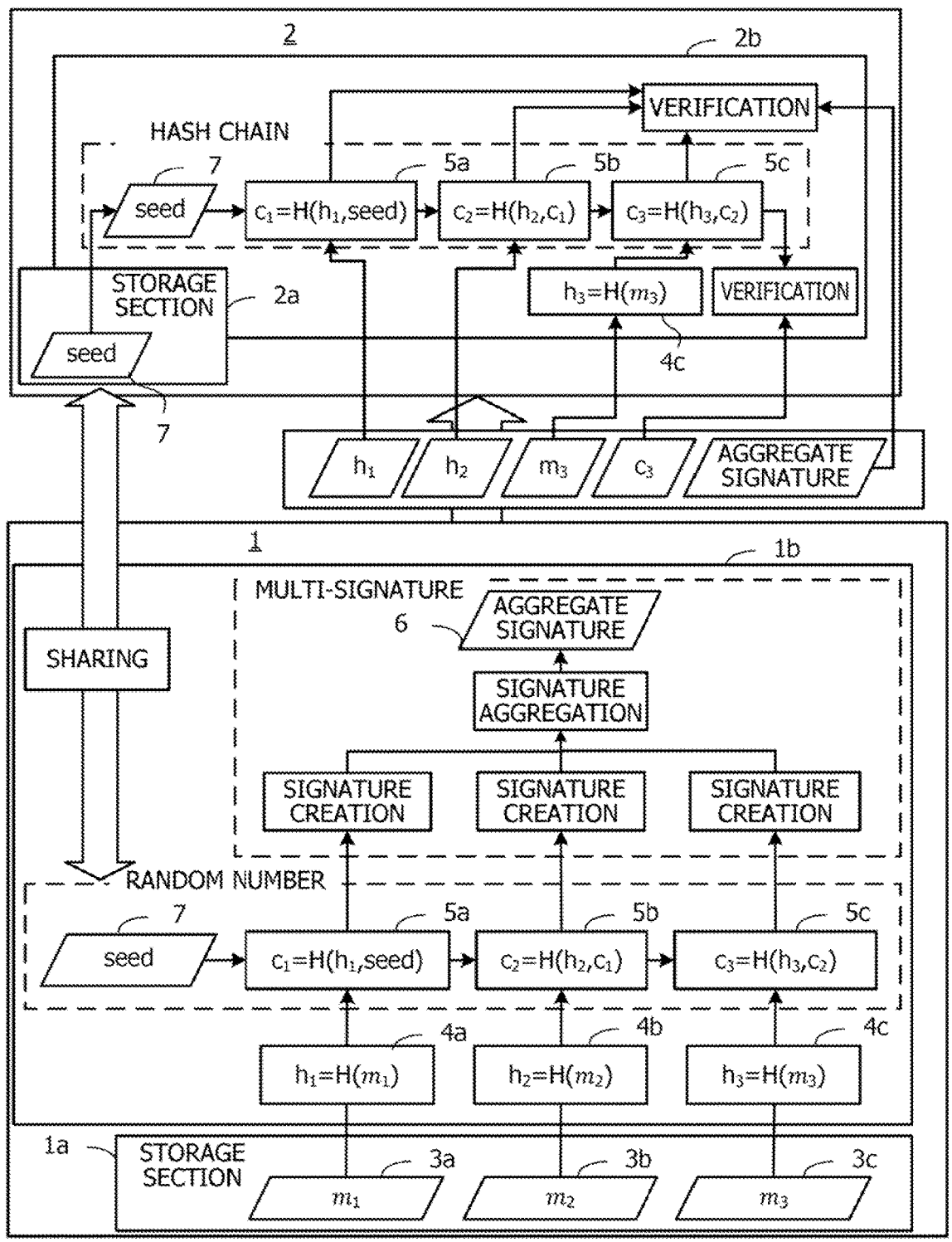
FIG. 1 illustrates an example of a verification method according to a first embodiment.

FIG. 1 illustrates an example of a verification method according to a first embodiment. The verification method according to the first embodiment is achieved by coordinated operations of a first computer system 1 and a second computer system 2.

The first computer system 1 includes, for example, one or multiple information processing devices (for example, computers). The first computer system 1 includes a storage section $1a$ and a processing section $1b$. The storage section $1a$ is, for example, a memory of the information processing device included in the first computer system 1 or a storage device of the information processing device included in the first computer system 1. The processing section $1b$ is, for example, a processor of the information processing device included in the first computer system 1 or an arithmetic circuit of the information processing device included in the first computer system 1.

The second computer system 2 includes, for example, one or multiple information processing devices (for example, computers). The second computer system 2 includes a storage section $2a$ and a processing section $2b$. The storage section $2a$ is, for example, a memory of the information processing device included in the second computer system 2 or a storage device of the information processing device included in the second computer system 2. The processing section $2b$ is, for example, a processor of the information processing device included in the second computer system 2 or an arithmetic circuit of the information processing device included in the second computer system 2.

The processing section $1b$ of the first computer system 1 affixes an electronic signature to a document in the following procedure. When a document $3a$ that is an original document is created, the processing section $1b$ calculates an original document's first hash value $4a$ that is a hash value for the document $3a$, The processing section $1b$ calculates an original document's second hash value Sa that is a hash value based on the original document's first hash value $4a$.

The processing section $1b$ may use a random number 7 shared with the second computer system 2 in the calculation of the original document's second hash value Sa, for example. In this case, for example, the processing section $2b$ of the second computer system 2 generates the random number 7 and transmits the random number 7 to the first computer system 1. The processing section $2b$ causes the generated random number 7 to be stored in the storage section $2a$. The processing section $1b$ of the first computer system 1 receives the random number 7, calculates a hash value obtained by combining the original document's first hash value $4a$ and the random number 7, and treats the result of the calculation as the original document's second hash value Sa.

After the calculation of the original document's second hash value $5a$, the processing section $1b$ uses a private key of a creator of the original document $3a$ and the original document's second hash value Sa to create a first signature for the original document.

After that, when a first modified version document $3b$ is created by modifying the original document $3a$, the processing section $1b$ calculates a first modified version's first hash value $4b$ that is a hash value for the first modified version document $3b$. Then, the processing section $1b$ calculates a first modified version's second hash value b that is a hash value obtained by combining the first modified version's first hash value $4b$ and the original document's second hash value $5a$.

After the calculation of the first modified version's second hash value $5b$, the processing section $1b$ uses a private key of a creator of the first modified version document $3b$ and the first modified version's second hash value $5b$ to create a second signature for the first modified version document.

After that, when a second modified version document $3c$ is created by modifying the first modified version document, the processing section $1b$ calculates a second modified version's first hash value $4c$ that is a hash value for the second modified version document $3c$. Then, the processing section 1b calculates a second modified version's second hash value 5c that is a hash value obtained by combining the second modified version's first hash value 4c and the first modified version's second hash value 5b.

When the second modified version document 3c is further modified, the processing section 1b may calculate hash values of two levels and create a signature in the same manner as described above. In the calculation of a second-level hash value, the processing section 1b uses a second-level hash value generated in the creation of a document before a modification to calculate the second-level hash value for a document after the most recent modification. In this manner, a hash chain of the second-level hash values (that are the original document's second hash value Sa, the first modified version's second hash value 5b, and the second modified version's second hash value Sc) is generated.

The processing section 1b may aggregate a plurality of signatures into a single aggregate signature. For example, the processing section 1b creates an aggregate signature 6 by aggregating the first signature, the second signature, and a third signature.

The processing section 2b of the second computer system 2 uses the original document's first hash value 4a, the first modified version's first hash value 4b, and the second modified version's first hash value 4c to verify the validity of the second modified version's second hash value Sc. For example, when the random number 7 has been used to generate the original document's first hash value 4a by the first computer system 1, the processing section 2b reads the random number 7 from the storage section 2a. The processing section 2b calculates the original document's second hash value Sa based on the random number 7 and the original documents first hash value 4a. The processing section 2b calculates the first modified version's second hash value 5b based on the original document's second hash value Sa and the first modified version's first hash value 4b. The processing section 2b uses the first modified version's second hash value 5b and the second modified version's first hash value 4c to calculate the second modified version's second hash value 5c. The processing section 2b verifies the validity of the second modified version's second hash value 5c by confirming that the second modified version's second hash value 5c calculated by the processing section 2b matches the second modified version's second hash value 5c calculated by the processing section 1b of the first computer system 1.

The processing section 2b may use the second modified version document 3c to calculate the second modified version's second hash value Sc. In this case, the processing section 2b may acquire the original document's first hash value 4a, the first modified version's first hash value 4b, the second modified version document 3c, and the second modified version's second hash value Sc from the first computer system 1 in order to execute a verification process.

When the second modified version document 3c is a final version document, the processing section 2b of the second computer system 2 verifies a plurality of signatures affixed in the creation of the second modified version document 3c. For example, the processing section 2b acquires a public key of the creator of the original document 3a, a public key of the creator of the first modified version document 3b, and a public key of a creator of the second modified version document 3c from a certificate authority. The processing section 2b uses the acquired public keys to verify the validity of the first signature, the validity of the second signature, and the validity of the third signature.

For example, the processing section 2b acquires the original document's second hash value 5a, the first modified version's second hash value 5b, and the second modified version's second hash value c that have been generated in the verification of the validity of the second modified version's second hash value 5c. The processing section 2b may use the original document's second hash value 5a and the public key of the creator of the original document 3a to verify the first signature affixed to the original document 3a. The processing section 2b may use the first modified version's second hash value 5b and the public key of the creator of the first modified version document 3b to verify the second signature affixed to the first modified version document 3b, The processing section 2b may use the second modified version's second hash value 5c and the public key of the creator of the second modified version document 3c to verify the third signature affixed to the second modified version document 3c.

When the plurality of signatures are already aggregated in the first computer system 1, the processing section 2b of the second computer system 2 acquires the aggregate signature 6 from the first computer system 1. The processing section 2b verifies the validity of the signatures in a process of verifying the aggregate signature 6 once.

In a system described above, for example, when a user (verifier) of the second computer system 2 wants to confirm that the second modified version document 3c has been reviewed by a valid reviewer, the original document 3a or the first modified version document 3b may not be disclosed to the verifier. For example, the second computer system 2 may reliably verify a plurality of signatures without using a document being modified.

For example, the second computer system 2 verifies the validity of the second modified version's second hash value 5c generated in the hash chain without the disclosure of details of the original document 3a or details of the first modified version document 3b to the second computer system 2. The second computer system 2 may verify that the second modified version's second hash value 5c acquired from the first computer system 1 is valid only when the original document's second hash value Sa and the first modified version's second hash value 5b are valid.

When the validity of the second modified version's second hash value 5c is verified, the processing section 2b may confirm reviewers by confirming the creators of the original document 3a and the first modified version document 3b from which the original document's second hash value 5a and the first modified version's second hash value 5b have been generated. The processing section 2b may confirm the creators of the original document 3a and the first modified version document 3b by verifying the signatures By verifying the validity of the second modified version's second hash value 5c using the hash chain, it is possible to suppress reviewer's impersonation, such as replacement of a signature, and to confirm that the documents have been reviewed by the valid reviewers.

In the example illustrated in FIG. 1, the first computer system 1 and the second computer system 2 share the random number 7 and use the random number 7 to calculate the hash chain. It is therefore possible to confirm that the second modified version document 3c that is the final version document has been created in accordance with a request from the verifier using the second computer system 2.

The processing section 1b of the first computer system 1 may use a random number to calculate the original document's first hash value 4a, the first modified version's first hash value 4b, and the second modified version's first hash value 4c. For example, the processing section 1b calculates the original document's first hash value 4a based on the original document 3a and a first random number. The processing section 1b calculates the first modified version's first hash value 4b based on the first modified version document 3b and a second random number. The processing section 1b calculates the second modified version's first hash value 4c based on the second modified version document 3c and a third random number. In this case, the processing section 2b of the second computer system 2 calculates the second modified version's first hash value 4c using the second modified version document 3c acquired from the first computer system 1 and the third random number acquired from the first computer system 1.

By using the random numbers to calculate the original document's first hash value 4a, the first modified version's first hash value 4b, and the second modified version's first hash value 4c, it is possible to improve the safety of the original document's first hash value 4a, the first modified version's first hash value 4b, and the second modified version's first hash value 4c.

The verifier may want to verify details of the first modified version document 3b. In this case, when a user of the first computer system 1 determines to permit the disclosure of the details of the first modified version document 3b to the verifier, the second computer system 2 may verify the validity of the first modified version's first hash value 4b. For example, the processing section 2b of the second computer system 2 uses the first modified version document 3b acquired from the first computer system 1 and the second random number acquired from the first computer system 1 to verify the validity of the first modified version's first hash value 4b acquired from the first computer system 1.

As described above, when the user of the first computer system 1 gives the permission, the second computer system 2 may easily verify the modified version document and ensure high convenience.

Second Embodiment

A second embodiment describes a system that may improve the convenience of a document that includes an electronic signature and is distributed between a plurality of organizations. In the following description, a document creator is an entity that creates a document first and aims to have a verifier verify the document finally, Reviewers (including a section chief, a section manager, and a department manager) are entities that review the created document and transmit hash values for reviewed parts and signatures for the reviewed parts to an agent. The agent is an entity that aggregates signatures affixed by the document creator and the reviewers. The verifier is an entity that uses information obtained from the agent to perform verification via a hash chain and multi-signature.

[Hardware Configuration of System]

First, a hardware configuration of a system according to the second embodiment is described.

Figure 2:
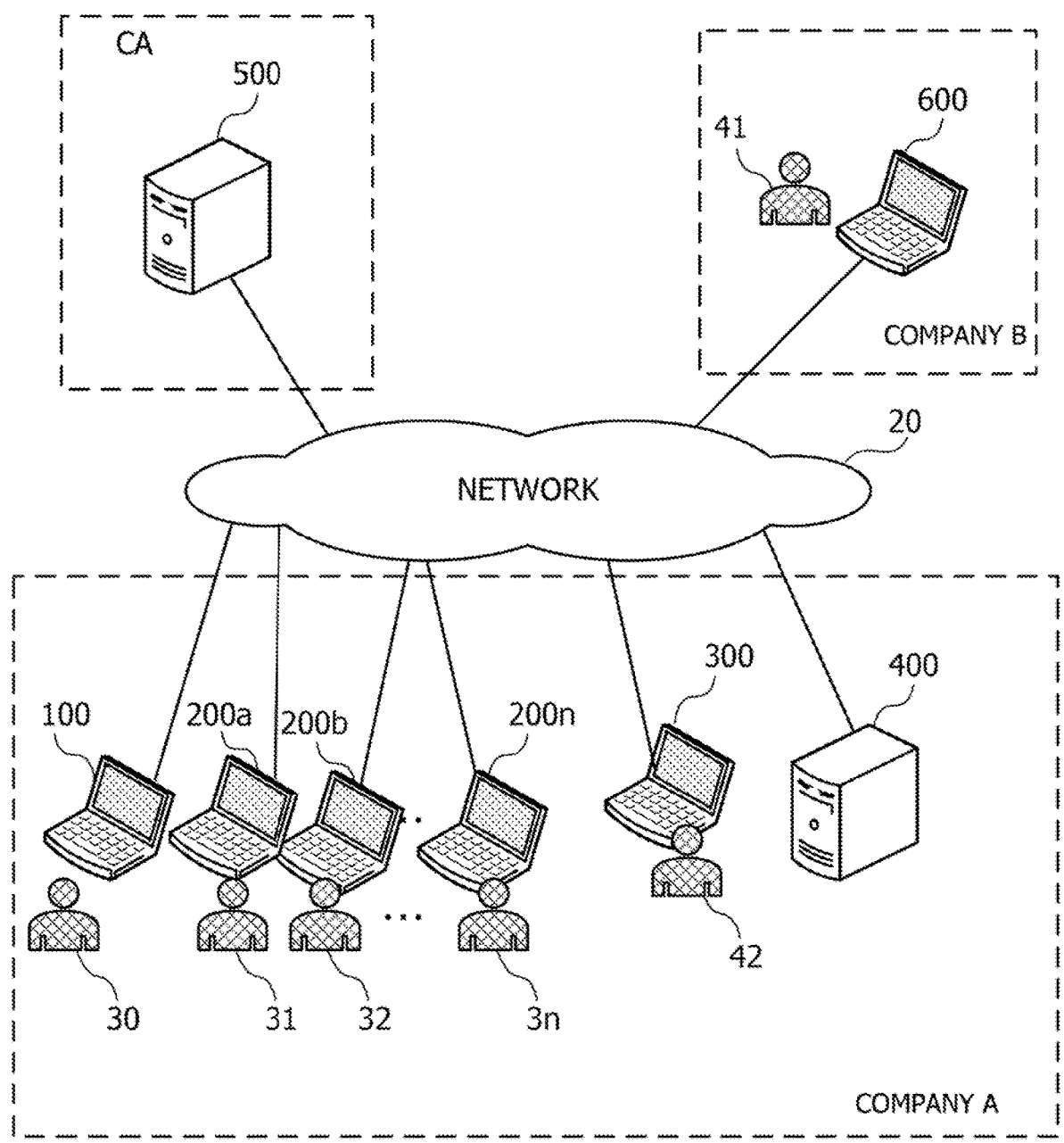
FIG. 2 illustrates an example of a system according to a second embodiment.

FIG. 2 illustrates an example of the system according to the second embodiment. The example illustrated in FIG. 2 assumes that a verifier 41 of a company B verifies the validity of a document created by a company A.

The company A has a creator terminal 100, reviewer terminals 200a, 200b, . . . , and 200n, an agent terminal 300, and a document storage server 400. The creator terminal 100 is a computer to be used by a document creator 30. The reviewer terminals 200a, 200b, . . . , and 200n are computers to be used by reviewers 31, 32, . . . , and 3n. The agent terminal 300 is a computer to be used by an agent 42. The document storage server 400 is a computer that stores the created document, modified documents, information used to sign the documents, and the like.

The creator terminal 100, the reviewer terminals 200a, 200b, . . . , and 200n, the agent terminal 300, and the document storage server 400 are coupled to a network 20. In a certificate authority (CA), a CA server 500 is installed. In the company B, a verifier terminal 600 is installed. The CA server 500 and the verifier terminal 600 are coupled to the network 20. The CA is an organization that issues a certificate for a public key to be used to verify a signature. The CA server 500 is a computer that issues the certificate for the public key via the network 20. The verifier terminal 600 is a computer to be used by the verifier 41 to verify a signature.

In the company A, the document creator 30 uses the creator terminal 100 to create the document. The creator terminal 100 affixes an electronic signature of the document creator 30 to the created document. The plurality of reviewers 31, 32, . . . , and 3n belong to the company A and use the reviewer terminals 200a, 200b, . . . , and 200n to review and modify the documents. The reviewer terminals 200a, 200b, . . . , and 200n affix electronic signatures of the reviewers 31, 32, . . . , and 3n to the modified documents. The agent 42 uses the agent terminal 300 to aggregate the plurality of signatures affixed to the documents into a single aggregate signature. The agent terminal 300 affixes the aggregate signature obtained by aggregating the plurality of signatures to a final version document and transmits the final version document with the aggregate signature to the verifier terminal 600, The verifier terminal 600 acquires public keys of the document creator 30 and the reviewers 31, 32, . . . , and 3n from the CA server 500 and uses the public keys to verify the signature of the received document.

Figure 3:
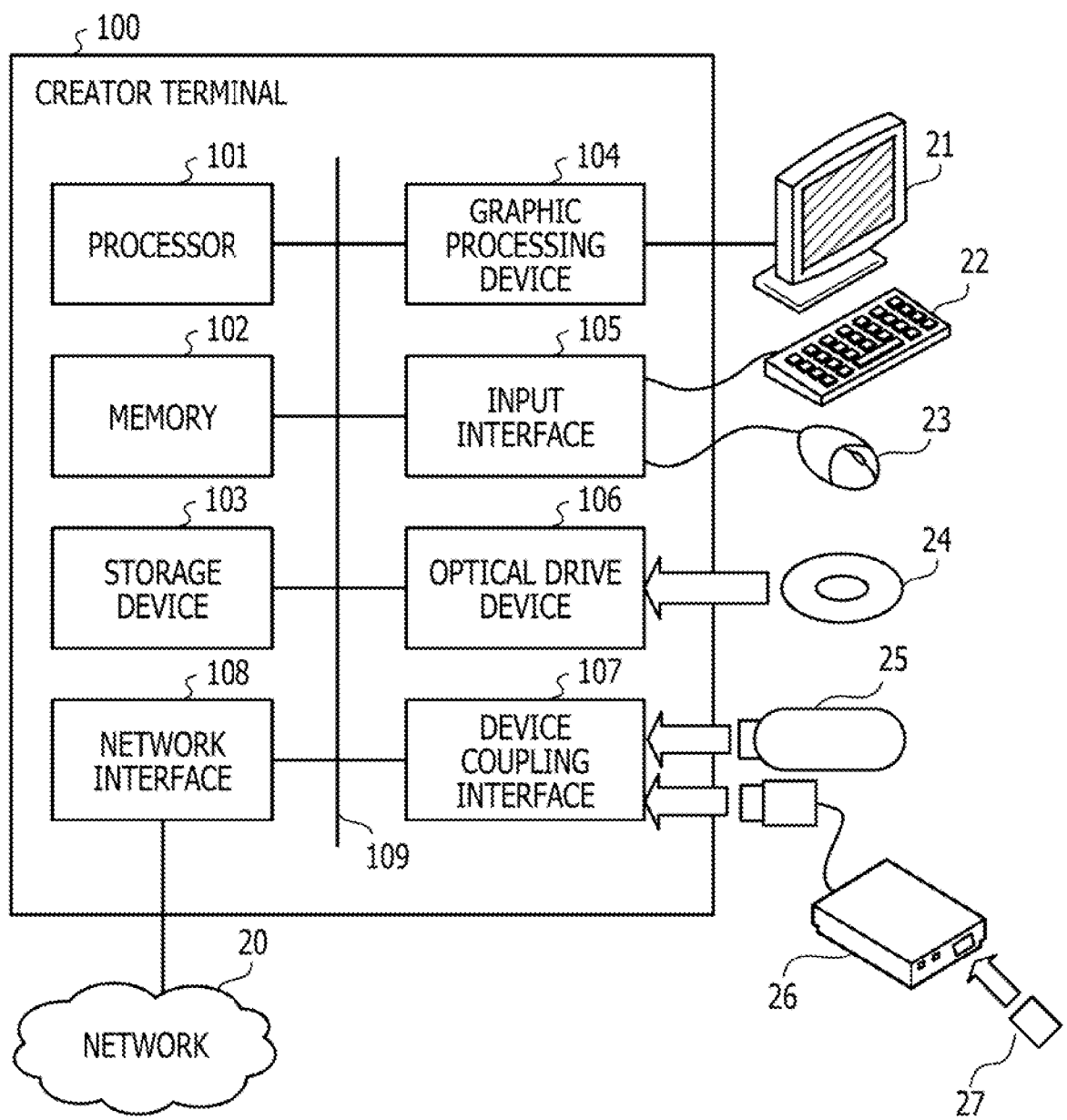
FIG. 3 illustrates an example of a configuration of hardware of a computer.

FIG. 3 illustrates an example of a configuration of hardware of a computer. FIG. 3 illustrates a hardware configuration of the creator terminal 100 as a representative example.

The creator terminal 100 is entirely controlled by a processor 101. The processor 101 is coupled to a memory 102 and a plurality of peripheral devices via a bus 109. The processor 101 may be a multiprocessor. The processor 101 is, for example, a central processing unit (CPU), a microprocessor unit (MPU), or a digital signal processor (DSP). The processor 101 executes a program, thereby achieving functions. Some of the functions may be achieved by an electronic circuit, such as an application-specific integrated circuit (ASIC) or a programmable logic device (PLD).

The memory 102 is used as a main storage device of the creator terminal 100. In the memory 102, a part or all of a program of an operating system (OS) to be executed by the processor 101 and an application program is or are temporarily stored. In the memory 102, various data to be used in a process by the processor 101 is stored. As the memory 102, a volatile semiconductor storage device, such as a random-access memory (RAM), is used, for example.

As the peripheral devices coupled to the bus 109, a storage device 103, a graphic processing device 104, an input interface 105, an optical drive device 106, a device coupling interface 107, and a network interface 108 exist.

The storage device 103 electrically or magnetically writes and reads data to and from a recording medium included in the storage device 103. The storage device 103 is used as an auxiliary storage device of the computer. In the storage device 103, the program of the OS, the application program, and the various data are stored. As the storage device 103, a hard disk drive (HDD) or a solid-state drive (SSD) may be used, for example.

The graphic processing device 104 is coupled to a monitor 21. The graphic processing device 104 displays an image on a screen of the monitor 21 in accordance with an instruction from the processor 101. The monitor 21 is a display device with a cathode-ray tube (CRT), a liquid crystal display device, or the like.

The input interface 105 is coupled to a keyboard 22 and a mouse 23. The input interface 105 transmits, to the processor 101, signals transmitted from the keyboard 22 and the mouse 23. The mouse 23 is an example of a pointing device. Another pointing device may be used. The other pointing device is a touch panel, a tablet, a touch pad, a trackball, or the like.

The optical drive device 106 uses laser light or the like to read data stored in an optical disc 24. The optical disc 24 is a portable recording medium storing data that is readable by light reflection. The optical disc 24 is a digital versatile disc (DVD), a DVD-RAM, a compact disc read-only memory (CD-ROM), a CD-recordable (CD-R), a CD-rewritable (CD-RW), or the like.

The device coupling interface 107 is a communication interface that couples the peripheral devices to the creator terminal 100. For example, the device coupling interface 107 may be coupled to a memory device 25 and a memory reader writer 26. The memory device 25 is a recording medium having a communication function of communicating with the device coupling interface 107. The memory reader writer 26 is a device that writes data to the memory card 27 or reads data from the memory card 27. The memory card 27 is a card-type recording medium.

The network interface 108 is coupled to the network 20. The network interface 108 transmits and receives data to and from another computer or a communication device via the network 20.

The foregoing hardware configuration may achieve processing functions of the creator terminal 100 according to the second embodiment. The reviewer terminals 200a, 200b, . . . , and 200n, the agent terminal 300, the document storage server 400, the CA server 500, and the verifier terminal 600 may be achieved by the same hardware as that of the creator terminal 100. The information processing device included in the first computer system 1 or the information processing device included in the second computer system 2 may be achieved by the same hardware as that of the creator terminal 100 illustrated in FIG. 3.

The creator terminal 100 executes a program stored in, for example, a computer-readable recording medium, thereby achieving the processing functions of the creator terminal 100 according to the second embodiment. The program that describes details of processes to be executed by the creator terminal 100 may be stored in various recording media. For example, the program to be executed by the creator terminal 100 may be stored in the storage device 103. The processor 101 loads a part of the program within the storage device 103 or the entire program within the storage device 103 into the memory 102 and executes the program. The program to be executed by the creator terminal 100 may be stored in a portable recording medium, such as the optical disc 24, the memory device 25, or the memory card 27. For example, the program stored in the portable recording medium may be installed in the storage device 103 and executed under control by the processor 101. The processor 101 may read the program directly from the portable recording medium and execute the program.

The reviewer terminals 200a, 200b, . . . , and 200n, the agent terminal 300, the document storage server 400, the CA server 500, and the verifier terminal 600 may execute programs, thereby achieving processing functions of the devices according to the second embodiment.

The foregoing system may verify a plurality of signatures without disclosing a document being modified. To verify a plurality of signatures without disclosing a document being modified, the agent terminal 300 may aggregate the plurality of signatures into a single aggregate signature. However, it may not be sufficient to aggregate the plurality of signatures into the single aggregate signature in order not to disclose the document being modified. The difficulty of not disclosing the document being modified is described below.

[Difficulty of Not Disclosing Document Being Modified]

In recent years, the Japanese government has proposed Society 5.0 to Japan and other countries. Society 5.0 is a human-centered society that balances economic advancement with the resolution of social problems by a system that highly integrates a cyberspace (virtual space) and a physical space (real space).

To achieve corporate authentication and a trust service platform that are the basis of Society 5.0, a technique for authenticating people, organizations, and things and ensuring the integrity of data has been requested.

An electronic signature technique that is one of fundamental techniques for Society 5.0 is not yet widely used in the real society as expected due to a problem, such as current imbalance between a financial cost related to certificate introduction and an advantage of ensuring safety. On the other hand, in the theoretical research field of cryptography and signatures, many signature applications have been proposed. The signature applications are not limited to the use of seals and are used for approval between groups in an organization, an operation of collectively executing a plurality of signature verification tasks, and the like. When a service that has been hardly achieved from the perspective of the ensuring of safety and the guarantee of integrity is achieved, the service may provide a new value to users and lead to the wide use of electronic signatures.

For example, in business situations, electronic signatures may be used by a document creator and a verifier who belong to different organizations. Therefore, a challenge is to build a system via which the verifier trusts the validity of a created document. The second embodiment proposes the system that improves the efficiency and safety of a document that includes an electronic signature and is distributed between a plurality of organizations.

The second embodiment assumes that the system according to the second embodiment is used in an entire field in which an electronic signature is used to verify whether a document is not altered. The second embodiment assumes an electronic signature to be affixed to a document with a text changed by a plurality of organizations a plurality of times. The changes are, for example, update, deletion, addition, and the like.

When a public key infrastructure (PKI) is used to verify an electronic signature affixed to a document, the verification is performed by the document creator belonging to the company A, the verifier belonging to the company B, and the CA in accordance with the following simple procedure. The CA is a third-party organization.

[Step 1] The document creator 30 uses the creator terminal 100 to generate a user private key and a user public key and requests the CA server 500 to issue a certificate.

[Step 2] The document creator 30 uses the creator terminal 100 to use the user private key to affix an electronic signature to a document created by the document creator 30. The document creator 30 uses the creator terminal 100 to send the signed document and the certificate to the verifier.

[Step 3] The verifier 41 uses the verifier terminal 600 to verify the certificate, acquires the public key described in the certificate, and verifies the validity of the electronic signature affixed to the document.

A detail of a document with an electronic signature affixed thereto may not be changed. In an actual society, however, a use case in which a user other than a document creator reviews (changes the document by addition, deletion, modification, or the like) the document with the electronic signature is assumed. Therefore, a plurality of electronic signature methods that support the review have been proposed.

As a related technique, a method of reducing the amount of data to be verified for a document to be frequently partially modified from the perspective of the cost of transfer and storage and efficiently generating and verifying an electronic signature has been proposed (refer to International Publication Pamphlet No. WO 2006/008847 described above). In this method, the creator terminal 100 divides the original document into a plurality of blocks and creates partial identification information (hash value for a modified partial document block) only for the modified block. The verifier terminal 600 used by the verifier 41 uses a public key for verification to verify the partial identification information. Therefore, the third party that performs the verification may identify the modified part and confirm the invariance of other parts excluding the modified part.

As a related technique in another field, Chain Data Lineage (refer to "Masazumi Matsubara, Takeshi Miyamae, Akira Ito, Ken Kamakura, "Improving Reliability of Data Distribution Across Categories of Business and Industries with Chain Data Lineage", FUJITSU, Vol. 70, No. 4, p. 55-62, September 2019" described above) that is a technique for giving history information of data processing to promote the use of data has been proposed.

However, in the methods, every time a person (reviewer) reviews a document, the verifier uses the verifier terminal 600 to verify the originality of the document. Therefore, the verifier terminal 600 executes verification a certain number of times corresponding to the number of times that the document is reviewed.

Figure 4:
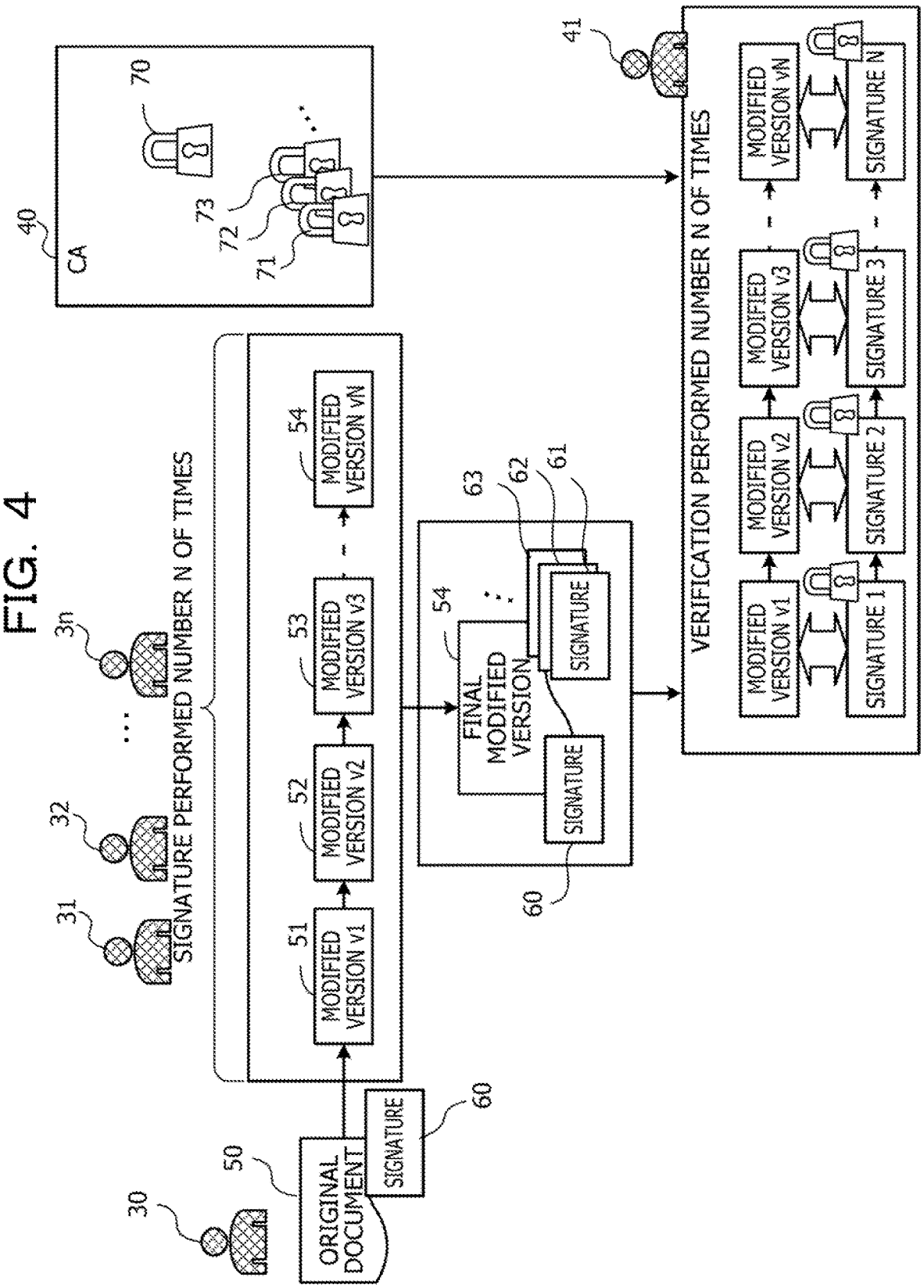
FIG. 4 illustrates a load of verifying modified details when a plurality of reviewers exist.

FIG. 4 illustrates a load of verifying modified details when a plurality of reviewers exist. The document creator 30 uses the creator terminal 100 to create an original document 50. The creator terminal 100 affixes an electronic signature 60 to the original document 50. The plurality of reviewers 31, 32, . . . , and 3n review the document 50 in order and use the reviewer terminals 200a, 200b, . . . , and 200n to modify details of the document 50. Then, the plurality of reviewers 31, 32, . . . , and 3n generate a plurality of modified version documents 51, 52, 53, . . . , and 54.

After the reviewers 31, 32, . . . , and 3n review the documents and modify details of the documents, the reviewers 31, 32, . . . , and 3n use the reviewer terminals 200a, 200b, . . . , and 200n to affix electronic signatures to the modified version documents. When the number of the reviewers 31, 32, . . . , and 3n is N (N is an integer of 1 or greater), the signature is performed a number N of times. The signature 60 of the document creator 30 and signatures 61, 62, . . . , and 63 of the reviewers 31, 32, . . . , and 3n are affixed to the final modified version document 54.

The verifier 41 may verify the validity of modified details of the document 54 modified by the reviewers 31, 32, . . . , and 3n in the foregoing manner. In this case, the verifier 41 uses the verifier terminal 600 to acquire public keys 70, 71, 72, 73, . . . for the document creator 30 and the reviewers 31, 32, . . . , and 3n from a certificate authority (CA) 40. The verifier 41 uses the verifier terminal 600 to verify the validity of the modified version document modified by the plurality of reviewers 31, 32, . . . , and 3n using the signatures of the document and the public keys of the reviewers who have modified the document.

As described above, when the plurality of reviewers exist and the verifier terminal 600 verifies the modified details, a processing load of the verifier terminal 600 increases. When the document is divided into a plurality of blocks, and each of the blocks is modified, the verifier terminal 600 verifies each of the blocks, and the processing load further increases.

For example, when a number N of reviewers exist and a document is divided into a number (M is an integer of 1 or greater) of blocks, signature verification is performed on modified version documents up to a number N*M of times. This means that the processing load of the verifier terminal 600, which originally completes the verification of the validity of the document by executing the signature verification (to guarantee the originality of the document created by the document creator) on the document once, increases. Therefore, the verifier 41 may want to reduce the load of executing the verification.

As a technique for reducing the number of times that a document with a plurality of signatures affixed thereto is verified, multi-signature exists. Multi-signature is a signature method that enables a plurality of signatures affixed to the same document to be aggregated into a single aggregate signature. Multi-signature may be used as a method of aggregating different signatures affixed to the "same document" using a "plurality of private keys". On the other hand, in the second embodiment, multi-signature is used as a method of aggregating different signatures affixed to "different" documents using a "plurality of private keys".

In multi-signature, when the verifier 41 successfully verifies the aggregate signature, the successful verification mathematically indicates that the verifier 41 has verified all the signatures. As a representative method of multi-signature, Schnorr multi-signature exists. The second embodiment is applicable to all signature methods supporting multi-signature, but the following assumes and describes the case where a Schnorr signature method is used.

Figure 5:
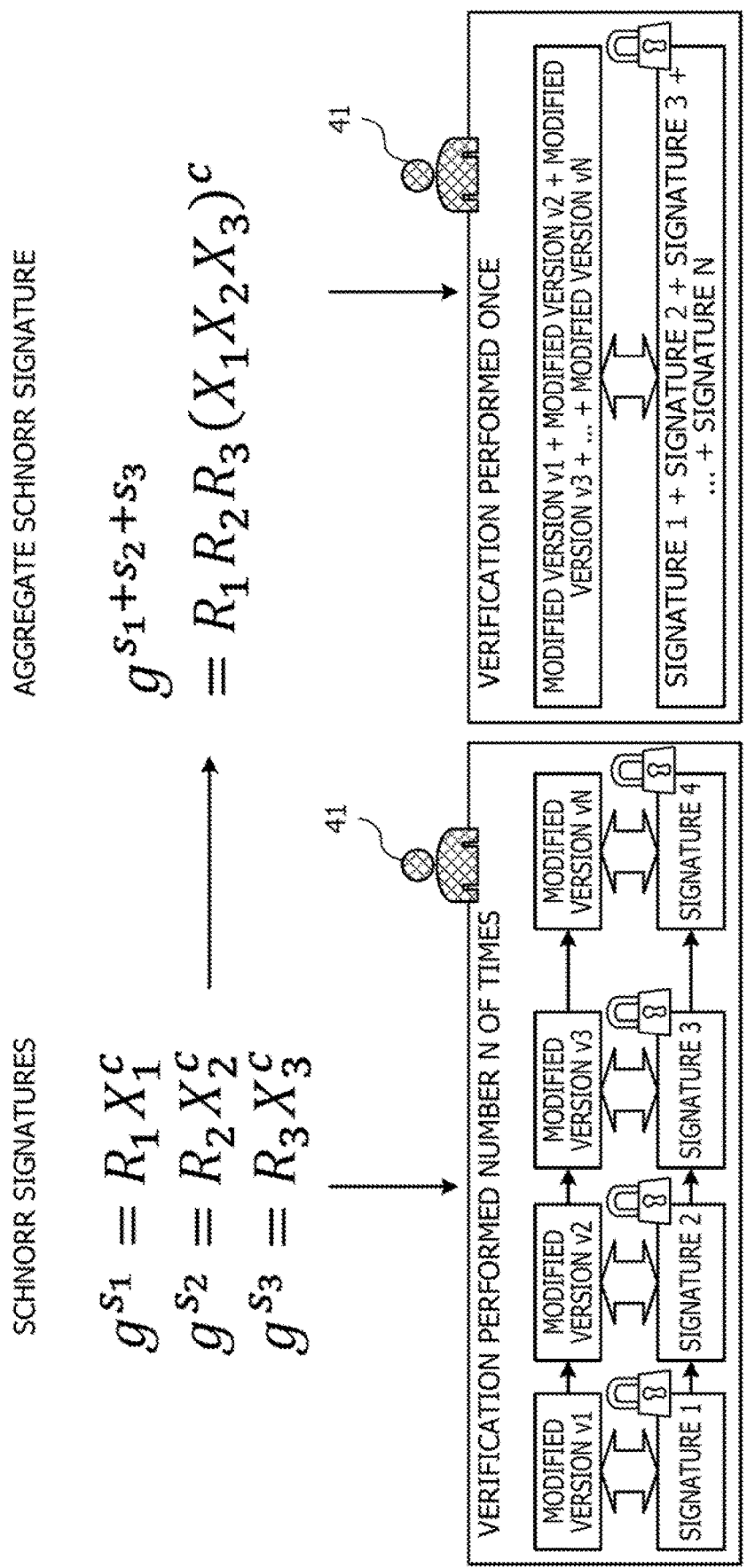
FIG. 5 illustrates an example of a reduction, caused by a Schnorr signature method, in the number of times that verification is executed.

FIG. 5 illustrates an example of a reduction, caused by the Schnorr signature method, in the number of times that verification is executed. A source of a group is g, the order of the group G is q, and a cryptographic hash function is H( ). In this case, g and q are signature parameters determined to be appropriate values so that encryption strength is high. A public key is generated using $X=g^x(\bmod\ q)$ for a private key x. A random number r that varies for each signature is used and a Schnorr signature (s, R) is created for a message m (corresponding to a document to be signed) as follows.

$$c:=H(m\|r)\ s:=r+cx\ R:=g^r$$

"||" indicates coupling of character strings. In this case, the Schnorr signature satisfies the following Equation (1).

$$g^s=RX^c \qquad (1)$$

In this case, the verifier terminal 600 acquires a hash value c of the message m, the Schnorr signature (s, R), and the public key X and may verify the validity of the message m by confirming that Equation (1) is satisfied.

Schnorr signatures $(s_1, R_1)$, $(s_2, R_2)$, and $(s_3, R_3)$ obtained using three different private keys $x_1, x_2,$ and $x_3$ (public keys are $X_1, X_2,$ and $X_3$) for the same message m are considered.

When the Schnorr signatures are expressed in the form of Equation (1), the left sides of equations indicating the Schnorr signatures are multiplied, and the right sides of the equations indicating the Schnorr signatures are multiplied, the Schnorr signatures satisfy the following Equation (2).

$$g^{s1+s2+s3} = R_1 R_2 R_3 (X_1 X_2 X_3)^C \quad (2)$$

By using Equation (2), $(s_1+s_2+s_3, R_1R_2R_3)$ may be used as an aggregate signature. As illustrated in FIG. 5, when the signatures are aggregated, the number of times that the verifier terminal 600 executes verification is 1.

Schnorr signatures $(s_4, R_4)$, $(s_5, R_5)$, and $(s_6, R_6)$ obtained using different private keys $x_4$, $x_5$, and $x_6$ (public keys are $X_4$, $X_5$, and $X_6$) for different messages $m_4$, $m_5$, and $m_6$, (hash values of the messages are $c_4$, $c_5$, and $c_6$) are considered. When the Schnorr signatures are expressed in the form of Equation (1), the left sides of equations indicating the Schnorr signatures are multiplied, and the right sides of the equations indicating the Schnorr signatures are multiplied, the Schnorr signatures satisfy the following Equation (3).

$$g^{s4+s5+s6} = R_4 R_5 R_6 (X_4^{c4} X_5^{c5} X_6^{c6}) \quad (3)$$

By using Equation (3), $(s_4+s_5+s_6, R_4R_5R_6)$ may be verified as an aggregate signature. For example, the verifier terminal 600 may verify the aggregate signature $(s_4+s_5+s_6, R_4R_5R_6)$ by using the hash values $c_4$, $c_5$, and $c_6$, the public keys $X_4$, $X_5$, and $X_6$, and the aggregate signature $(s_4+s_5+s_6, R_4R_5R_6)$ to confirm that Equation (3) is satisfied.

By using multi-signature in the foregoing manner, the signatures may be aggregated. When one document is divided into a plurality of blocks, and each of the blocks is modified, multi-signature and, for example, Partial Information Assuring Technology for Signature (PIATS) may be combined. PIATS is an example of a signature method that enables verification of a document with a text modified a plurality of times.

PIATS is a signature method in which a function is added to guarantee partial integrity (characteristic in which the correctness of a partial modification to a document is able to be certified by a third party) based on an arbitrary signature method. There are two types of PIATS. One of the types is a method that enables a document to be modified due to the guarantee of partial integrity. The other type is a method that anonymizes a document by redacting. In the second embodiment, PIATS of the former type is used to modify a document, A technique related to PIATS has been proposed in, for example, Japanese Laid-open Patent Publication No. 2007-213549 described above.

In Japanese Laid-open Patent Publication No. 2007-213549, aggregate signature and PIATS are used in combination. Aggregate signature is a signature technique for superimposing a plurality of signatures to form a single signature and collectively verifying the superimposed signatures. On the other hand, in the second embodiment, a multi-signature method is used. In the multi-signature method, the size of a signature does not depend on the number of times that a document is modified. An aggregate signature method is obtained by generalizing the multi-signature method. In the second embodiment, the aggregate signature method may be used.

Figure 6:
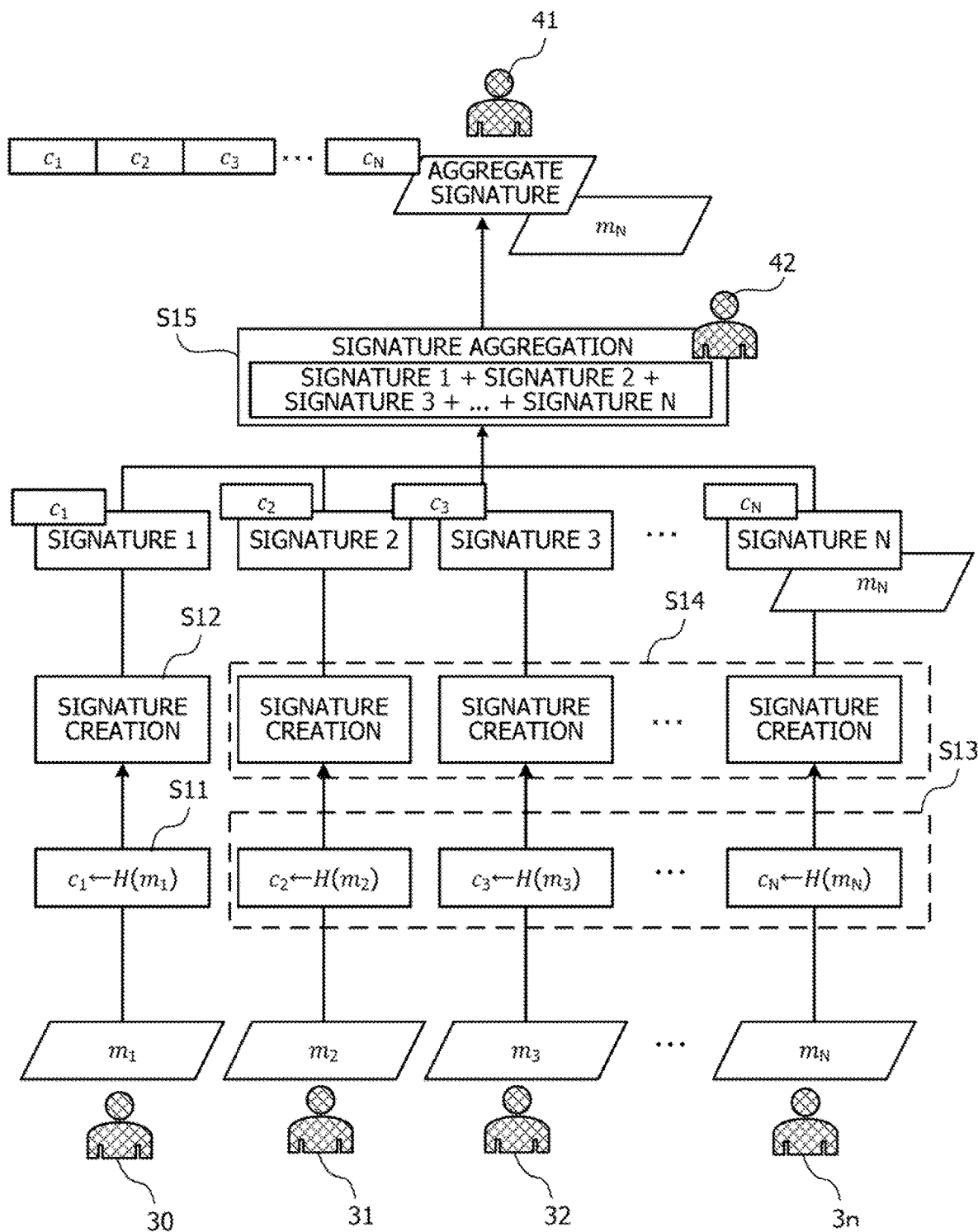
FIG. 6 illustrates an example of a procedure for a PIATS method based on multi-signature.

FIG. 6 illustrates an example of a procedure for a PIATS method obtained based on multi-signature. The creator terminal 100 creates a document "$m_1$" based on input of the document creator 30 and calculates a hash value "$c_1$" for the document "$m_1$" (step S11). The creator terminal 100 uses a private key of the creator terminal 100 to create a signature "signature 1" for the hash value "$c_1$" and transmits a combination "$c_1$, signature 1" of the hash value and the signature to the agent terminal 300 (step S12).

The reviewer terminals 200a, 200b, . . . , and 200n modify the document "$m_1$" in order based on input from the reviewers 31, 32, . . . , and 3n. After the reviewer terminals 200a, 200b, . . . , and 200n create modified documents "$m_2$, $m_3$, . . . , and $m_N$", the reviewer terminals 200a, 200b, . . . , and 200n calculate hash values "$c_2$, $c_3$, . . . , and $c_N$" for the documents "$m_2$, $m_3$, . . . , and $m_N$" (step S13). The reviewer terminals 200a, 200b, . . . , and 200n use private keys of the reviewer terminals 200a, 200b, . . . , and 200n to create signatures "signature 2, signature 3, . . . , and signature N" for the hash values "$c_2$, $c_3$, . . . , and $c_N$" (step S14). The reviewer terminals 200a, 200b, . . . , and 200n transmit combinations "($c_2$, signature 2), ($c_3$, signature 3), . . . , and ($c_N$, signature N)" of the hash values and the signatures to the agent terminal 300 used by the agent 42. The reviewer terminal 200n that has created the final modified version document "$m_N$" transmits the created modified version document "$m_N$" to the agent terminal 300.

The agent terminal 300 aggregates the signatures "signature 1, signature 2, signature 3, . . . , and signature N" (step S15). The agent terminal 300 creates an aggregate signature by aggregating the signatures. The agent terminal 300 transmits the modified document "m", the hash values "$c_1$, $c_2$, $c_3$, . . . , and $c_N$", and the aggregate signature to the verifier terminal 600 used by the verifier 41. The verifier terminal 600 executes a signature verification process based on the information received from the agent terminal 300.

Figure 7:
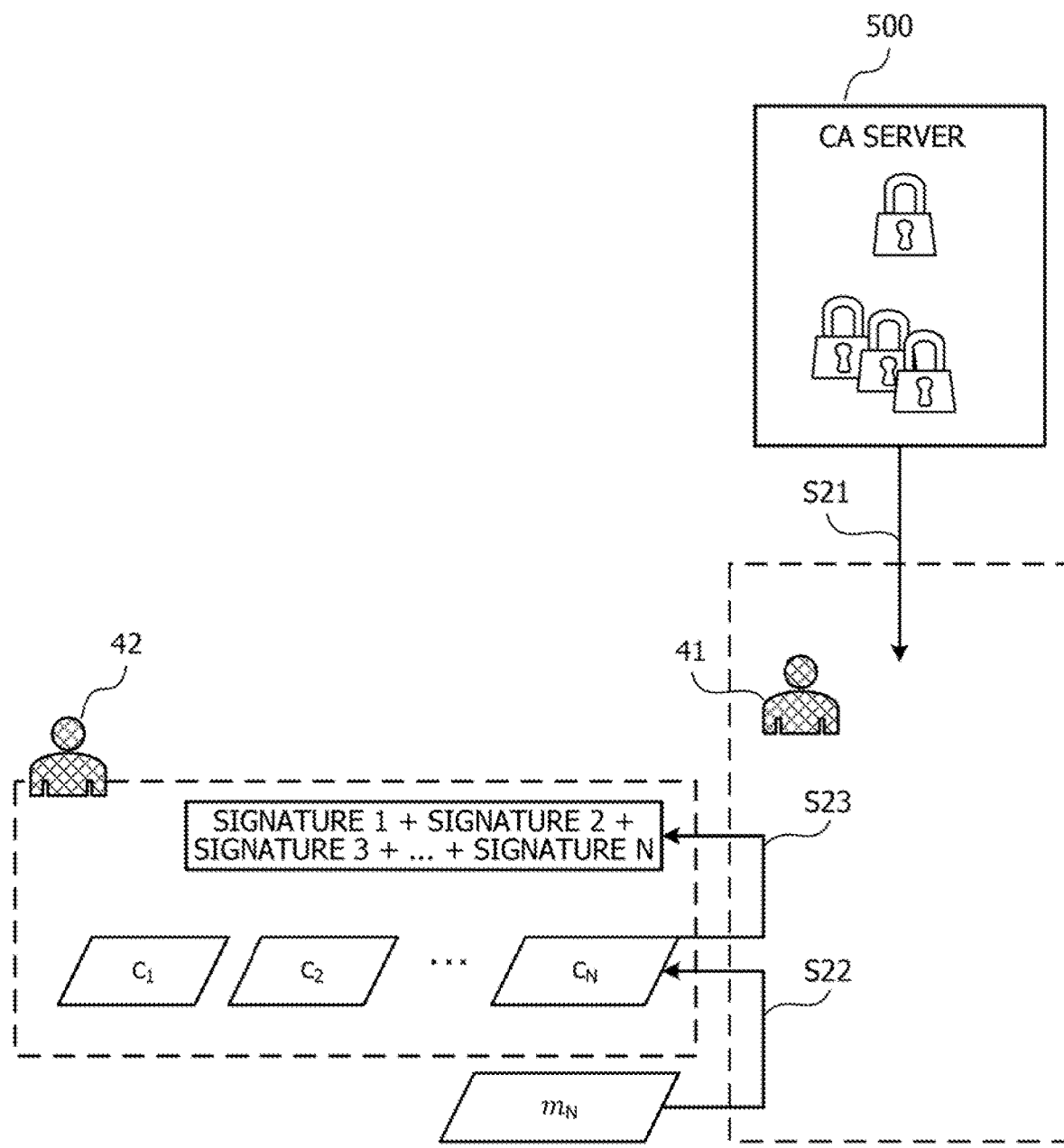
FIG. 7 illustrates an example of a procedure for a signature verification process.

FIG. 7 illustrates an example of a procedure for the signature verification process. The verifier terminal 600 acquires, from the CA server 500, a certificate for the public keys of the document creator 30 and the reviewers 31, 32, . . . , and 3n and verifies the validity of the public keys (step S21). The verifier terminal 600 calculates a hash value for the document "$m_N$" and verifies whether the calculated hash value matches the hash value "$c_N$" acquired from the agent terminal 300 (step S22). The verifier terminal 600 uses the public keys acquired from the CA server 500 to verify the aggregate signature for the hash values "$c_1$, $c_2$, . . . , and $c_N$" (step S23). The verification of step S21 is referred to as first verification. The verification of step S22 is referred to as second verification. The verification of step S23 is referred to as third verification.

The foregoing series of processes are the signature verification process when a technique for improving convenience of a document with an electronic signature is not used. The technique is proposed in the second embodiment. The foregoing signature verification process has the following problems.

The first problem is that the verifier 41 may view all or some of the modified version documents in order to verify whether the hash values for the modified version documents acquired by the verifier terminal 600 have not been replaced.

For example, the verifier terminal 600 may verify the validity of the hash values for the modified version documents and the validity of the aggregate signature for the hash values. However, the hash values for the modified version documents are values that are not related to each other and are independent of each other. Therefore, the verifier may not determine whether the hash values are for the modified version documents or for other totally unrelated messages.

As an example of the case where the problem occurs, the following case is considered. A pair of a hash value for an arbitrary modified version document and a signature of the arbitrary modified version document is replaced with a pair of another hash value and another signature. When the pair of the hash value and the signature is replaced, the verifier terminal 600 may not detect that the pair of the hash value and the signature has been replaced, and the pair of the hash value and the signature may pass the verification. Therefore, to verify validity indicating that a hash value for an arbitrary modified version document has not been replaced, the verifier terminal 600 is requested to view all (or some) of modified version documents, calculate hash values for the modified version documents, and confirm whether the calculated hash values match hash values acquired from the agent terminal 300.

Figure 8:
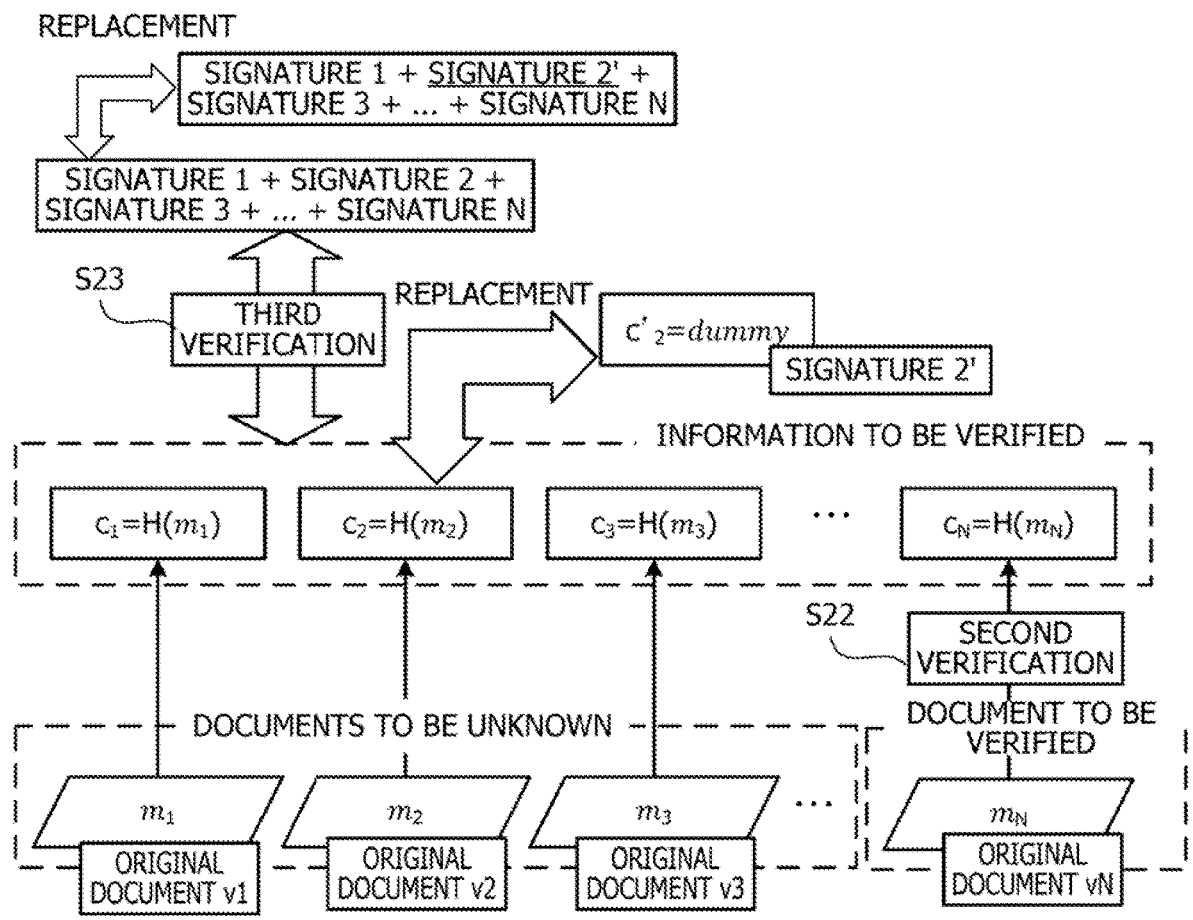
FIG. 8 illustrates an example of a problem that occurs when a technique proposed in the second embodiment is not used.

FIG. 8 illustrates an example of the problem that occurs when the technique proposed in the second embodiment is not used. In the example illustrated in FIG. 8, the hash value "$c_2$" for the document "$m_2$" is replaced with another hash value "$c'_2$". The "signature 2" for the document "$m_2$" is replaced with a "signature 2'".

In this case, in the second verification (step S22 illustrated in FIG. 7), the replaced hash value and the replaced signature are not used. Therefore, the second verification may be appropriately executed. The third verification (step S23 illustrated in FIG. 7) may be appropriately executed when there is no problem with consistency between the hash value "$c'_2$" and the "signature 2'".

For example, the foregoing replacement may be performed when the agent 42 is malicious or when a malicious third party uses the agent terminal 300 in an unauthorized manner. Replacing the signature means that the actual reviewer is hidden and that another person may pretend to have reviewed the document.

For example, the following case is considered. Software is delivered without approval by a responsible person of a quality control department, regardless of the fact that the approval by the responsible person is requested. In this case, a reviewer other than the responsible person of the quality control department may replace a hash value for a modified document and a signature of the reviewer with a hash value for a document signed by the responsible person of the quality control department in the past and a signature of the responsible person to pretend to have received approval of the responsible person of the quality control department.

To suppress the replacement of a hash value and a signature, the verifier terminal 600 may use the documents "$m_1, m_2, m_3, \ldots$" to the calculate hash values "$c_1, c_2, c_3, \ldots,$". However, a document that may be known to the verifier 41 is only the document "$m_N$" to be verified. The documents "$m_1, m_2, m_3, \ldots$" other than the final version document are not to be known to the verifier 41.

When the original document before a modification and a document being modified include information sharable only in the company A, the exposure of these documents to the outsider verifier may be a loss for the company A. As an example of the loss incurred by the company A, the document creator mistakenly enters confidential information of the company A in the document, and the confidential information is deleted by a reviewer and leaks. As another example of the loss incurred by the company A, a modified part of a source code has a major vulnerability and is deleted from the source code, and information of the modified part leaks.

On the other hand, the verifier 41 may want to confirm that a valid reviewer has reviewed the document and signed the document. However, a text described in a modified version document other than the final version document is unrequested information. However, when the verifier 41 is not able to view the modified version document using the verifier terminal 600, the reviewer 41 is not able to verify that a signature has been appropriately affixed to the document modified by the valid reviewer.

It is difficult not to disclose the progress of the modification of the document only by simply using multi-signature to aggregate a plurality of signatures and generate an aggregate signature. For example, the problem of how the document creating side (company A) makes the verifying side (company B) verify the final version document without disclosing a modified version document remains as a technical problem.

[Overview of Proposed Technique for Verifying Document without Disclosure of Modified Version Document]

In the second embodiment, each of the creator terminal 100 and the reviewer terminals 200*a*, 200*b*, . . . , and 200*n* mixes a variable with a modification history reflected therein into a document to be signed and signs the document. The variables to be mixed are generated from a hash chain. The hash chain is a chained data structure formed using a hash function (function for which it is computationally difficult to calculate input from output).

Figure 9:
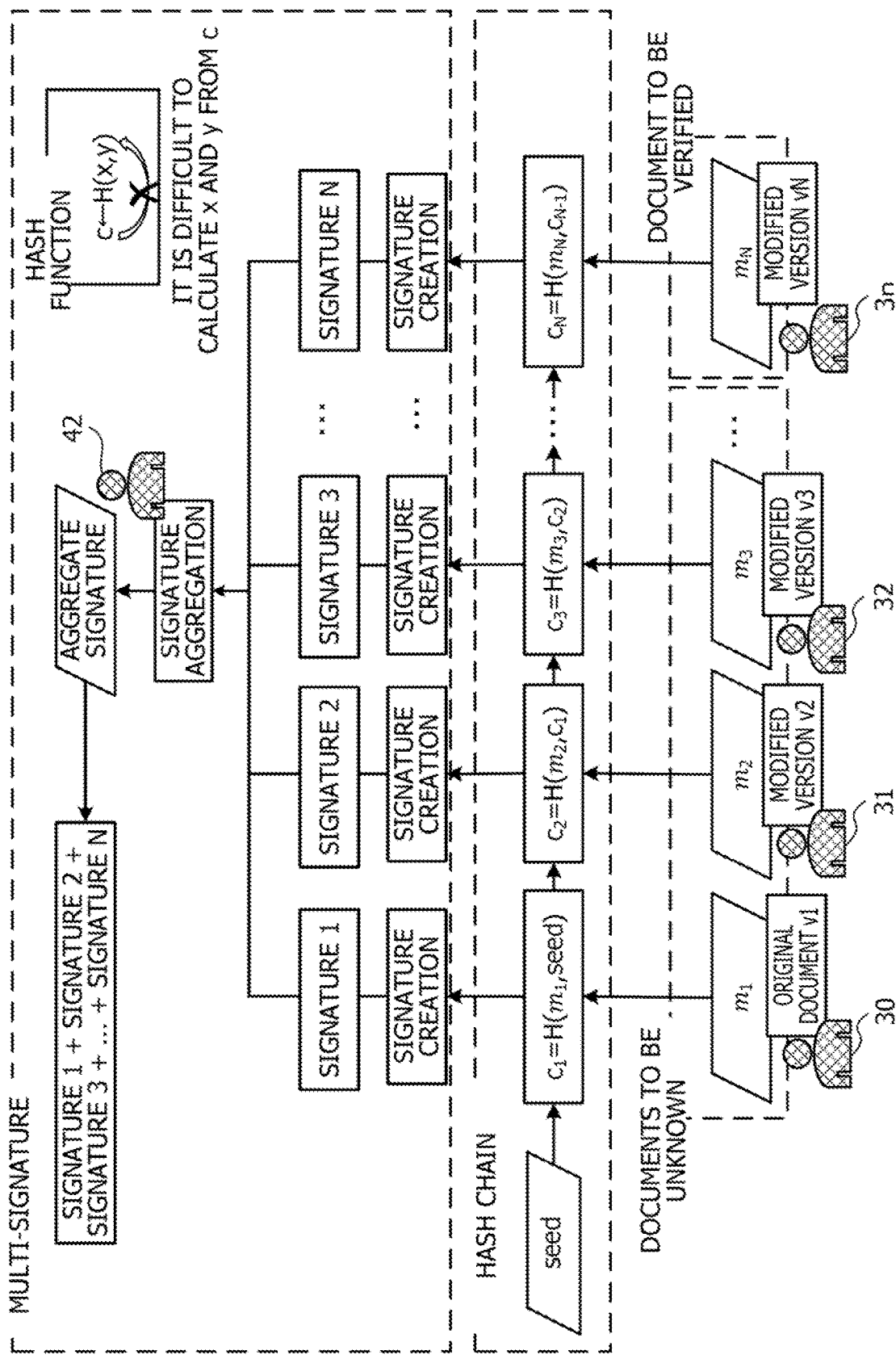
FIG. 9 illustrates an example of a signature procedure using a combination of multi-signature and a hash chain.

FIG. 9 illustrates an example of a signature procedure using a combination of multi-signature and the hash chain. It is assumed that a hash chain illustrated in FIG. 9 has a structure in which a "seed" (disposable random number) managed for each document is the top of the hash chain, each of the documents is embedded in a respective one of chains of the hash chain, and the final version document is embedded in the last chain of the hash chain. The verifier terminal 600 generates the "seed" and transmits the "seed" to the creator terminal 100. As the hash function to be used, a function that calculates a hash value c from variables x and y and for which it is difficult to calculate the variables x and y from the hash value c is used.

For example, the creator terminal 100 used by the document creator 30 uses the original document "$m_1$" and the "seed" as variables to calculate the hash value "$c_1$". When the modified version document "$m_2$" is created by the reviewer terminal 200*a* used by the reviewer 31, the reviewer terminal 200*a* uses the modified version document "$m_2$" and the hash value "$c_1$" as variables to calculate the hash value "$c_2$". A process of using a hash value for a document before a modification to successively calculate a hash value for a document after the modification is a hash chain. The original document and all modified version documents are used to generate the hash value "$c_N$" for the final version document "$m_N$".

The verifier 41 may not verify a relationship between a hash value for a modified version document and the modified version document even when the hash value for the modified version document is given to the verifier 41. However, as indicated in the example of FIG. 9, since the verifier terminal 600 and the creator terminal 100 share the "seed" before the creation of the document, the hash chain is started from the "seed". The verifier terminal 600 confirms that the hash values for the modified version documents have been embedded in the hash values of the hash chain started from the "seed" and that the hash chain has reached the hash value "$c_N$" calculated last for the final version document "$m_N$". Therefore, the verifier terminal 600 may confirm the validity of the hash values forming the chains and calculated for the modified version documents from characteristics of the hash chain. Lastly, the verifier terminal 600 verifies the aggregate signature created using characteristics of multi-signature and may confirm the validity of the signatures affixed to all the modified version documents.

The verifier terminal 600 seems to be able to use the variables (hash values "$c_1, c_2, c_3, \ldots,$ and $c_N$") with modification histories reflected therein, the final version document "$m_N$", and the aggregate signature for the final version document "$m_N$" to verify the final version document "$m_N$" and the aggregate signature for the final version document "$m_N$". For example, the documents "$m_1$, $m_2$, $m_3$, . . . " that the company A does not want the company B to know do not seem to be disclosed to the company B.

However, to verify the validity of the hash chain instead of the signature, the verifier terminal 600 calculates the hash values. For example, since the hash chain is newly introduced, the verification of the validity of the hash chain is requested. Since the documents "$m_1$, $m_2$, $m_3$, . . . " are used to calculate the hash chain, the company A may be requested to disclose the documents "$m_1$, $m_2$, $m_3$, . . . " to the verifier terminal 600.

Simply combining multi-signature and the hash chain does not solve the problem that the verifier is not able to verify the validity without the disclosure of all the modified version documents. To solve the problem, a hash chain with two-level hash conversion is used in the second embodiment.

Figure 10:
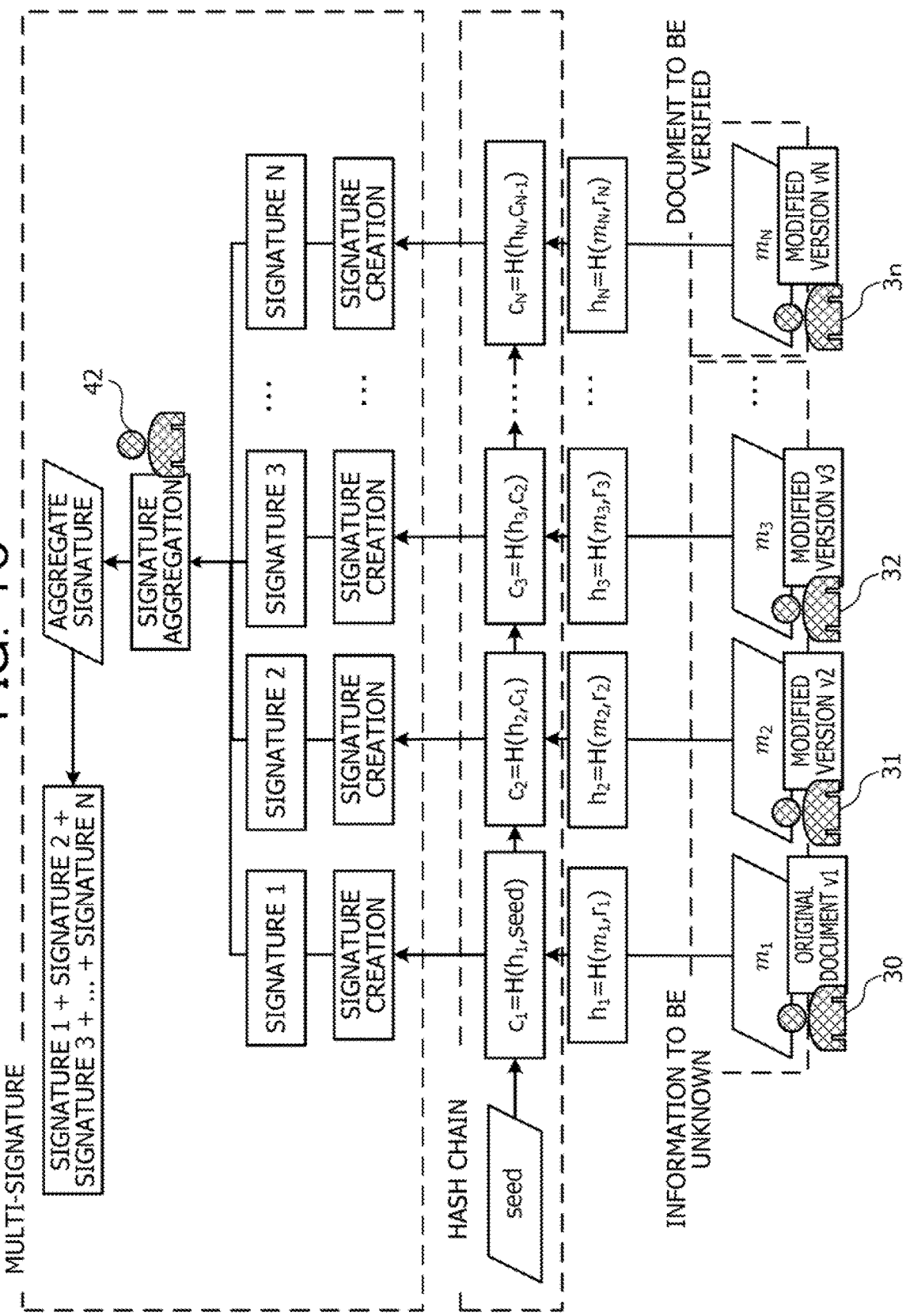
FIG. 10 illustrates an example of a signature procedure in which a hash chain with two-level hash conversion is used.

FIG. 10 illustrates an example of a signature procedure in which the hash chain with the two-level hash conversion is used. As illustrated in FIG. 9, the creator terminal 100 and the reviewer terminals 200a, 200b, . . . , and 200n use the hash function before the hash function is embedded in the hash chain. For example, the hash chain in which the hash function is used at two levels is used. In this case, first-level hash values "$h_1$, $h_2$, $h_3$, . . . , and $h_N$" are used to calculate the successive hash values "$c_1$, $c_2$, $c_3$, . . . , and $c_N$", instead of the documents "$m_1$, $m_2$, $m_3$, . . . , and $m_N$" used in the example illustrated in FIG. 8. To calculate the first-level hash values "$h_1$, $h_2$, $h_3$, . . . , and $h_N$", the documents "$m_1$, $m_2$, $m_3$, . . . , and $m_N$" and random numbers "$r_1$, $r_2$, $r_3$, . . . , and $r_N$" are used. For example, the creator terminal 100 uses the document "$m_1$" and the random number "$r_1$" as variables to calculate the hash value "$h_1$". The reviewer terminal 200a uses the document "$m_2$" and the random number "$r_2$" as variables to calculate the hash value "$h_2$".

Therefore, the documents "$m_1$, $m_2$, $m_3$, . . . , and $m_N$" are not directly used to calculate the successive hash values "$c_1$, $c_2$, $c_3$, . . . , and $c_N$". For example, to verify the validity of the hash chain, the verifier terminal 600 may not acquire the original document "$m_1$" or the documents "$m_2$, $m_3$, . . . " other than the final version document.

It is sufficient if the verifier terminal 600 has the "seed" and the hash values "$h_1$, $h_2$, $h_3$, . . . , and $h_N$" to verify the validity of the hash chain. Since the "seed" is a value generated by the verifier terminal 600, the verifier terminal 600 does not acquire the "seed" from the outside of the verifier terminal 600. Therefore, the verifier terminal 600 may acquire the hash values "$h_1$, $h_2$, $h_3$, . . . , and $h_N$" from a device (for example, the agent terminal 300) of the company A. The hash value "$h_N$" may be calculated using the final version document "$m_N$" and the random number "$r_N$". The final version document "$m_N$" is originally to be verified and the verifier terminal 600 acquires the final version document "$m_N$". The verifier terminal 600 acquires the random number "$r_N$", instead of the hash value "$h_N$", and may calculate the hash value "$h_N$".

The verifier terminal 600 acquires the hash values "$h_1$, $h_2$, $h_3$, . . . , and $h_N$" for all the documents "$m_1$, $m_2$, $m_3$, . . . , and $m_N$", the final version document "$m_N$", and the random number "$r_N$" for the final version document "$m_N$". The verifier terminal 600 uses the acquired information to confirm that the hash values "$h_1$, $h_2$, $h_3$, . . . , and $h_N$" for the original document and the modified version documents are included in the hash chain. It is, therefore, possible to confirm that the presented final version document "$m_N$" is to be verified and has been reviewed by the valid reviewers.

It is assumed that the verifier 41 verifies the final version document "$m_N$" in the process illustrated in FIG. 10. However, it is considered that the verifier 41 specifies any of the original document and the modified version documents and that the specified document is to be verified.

Figure 11:
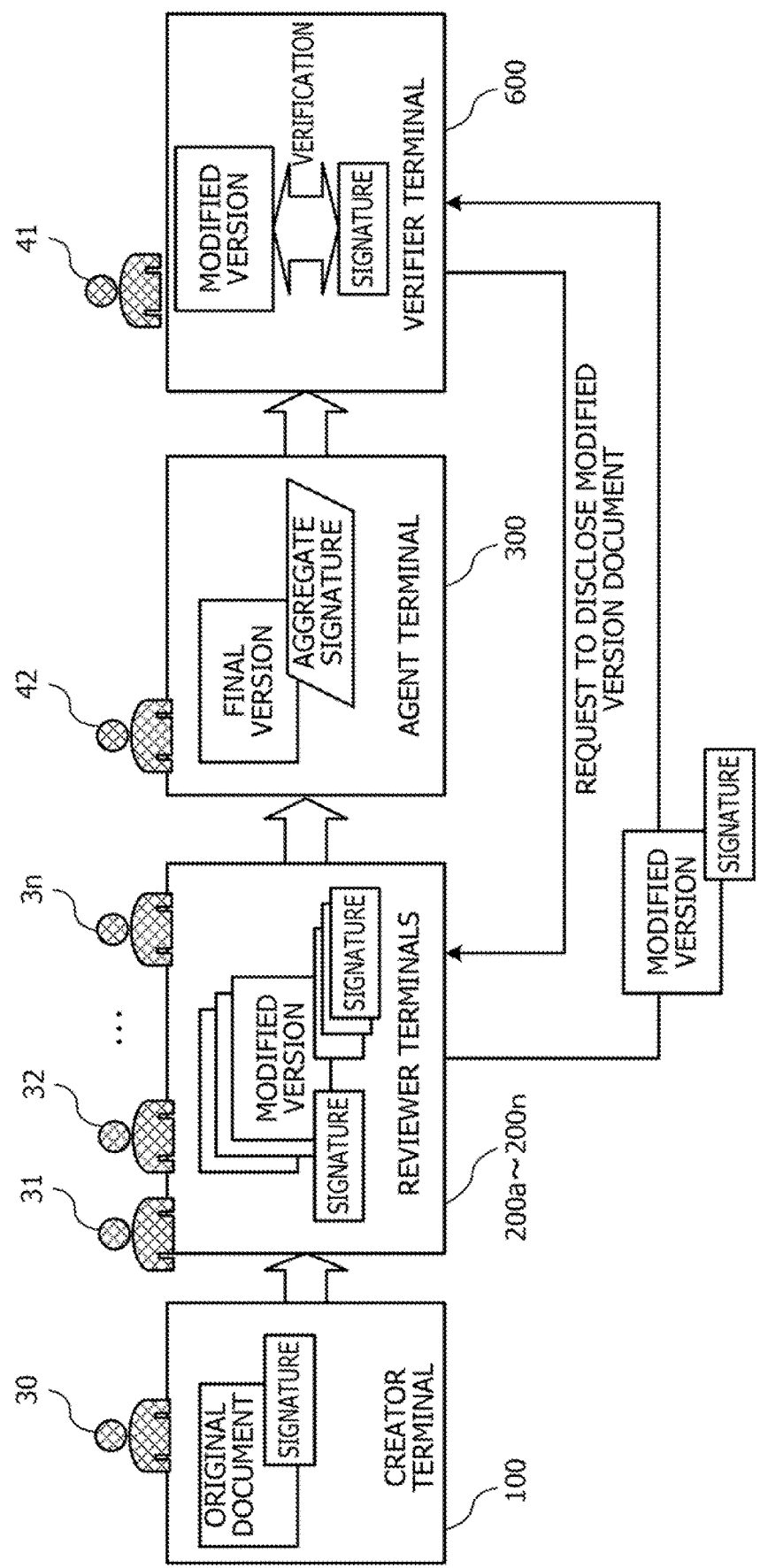
FIG. 11 illustrates an example of a procedure for verifying a modified version document.

FIG. 11 illustrates an example of a procedure for verifying a modified version document. For example, the verifier terminal 600 transmits, to a reviewer terminal used by a specific reviewer among the plurality of reviewers 31, 32, . . . , and 3n, a request to disclose a modified version document created by reviewing by the specific reviewer. The reviewer terminal receives the disclosure request and transmits the modified version document and a signature affixed to the modified version document to the verifier terminal 600. The verifier terminal 600 uses the signature to verify the validity of details of the received modified version document.

Although FIG. 11 illustrates the example in which the verifier terminal 600 transmits the request to disclose the modified version document, the verifier terminal 600 may transmit a request to disclose the original document. In this case, the verifier terminal 600 transmits the request to disclose the original document to the creator terminal 100.

The overview of the signature verification process according to the second embodiment is described above. The signature verification process is described below in detail.

[Devices' Functions for Signature Verification]

Next, functions included in the terminals within the system are described with reference to FIGS. 12 to 17.

Figure 12:
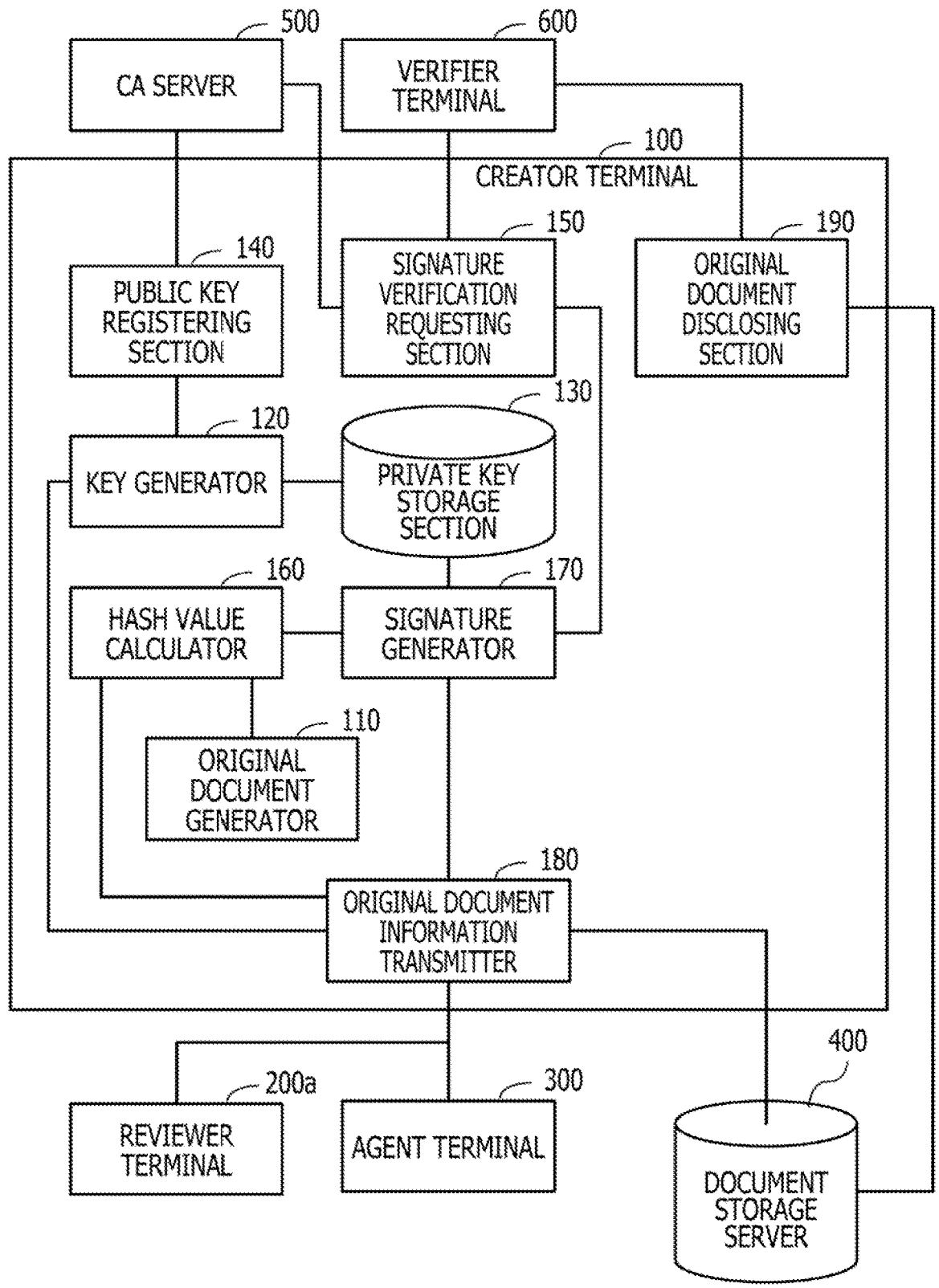
FIG. 12 is a block diagram illustrating an example of functions of a creator terminal.

FIG. 12 is a block diagram illustrating an example of functions of the creator terminal. The creator terminal 100 includes an original document generator 110, a key generator 120, a private key storage section 130, a public key registering section 140, a signature verification requesting section 150, a hash value calculator 160, a signature generator 170, an original document information transmitter 180, and an original document disclosing section 190.

The original document generator 110 creates the original document based on input from the document creator 30, The original document generator 110 transmits the created document to the key generator 120 and the hash value calculator 160.

The key generator 120 generates a pair of a private key to be used to affix a signature to the original document and a public key to be used to verify the signature. The key generator 120 causes the generated private key to be stored in the private key storage section 130. The key generator 120 transmits the generated public key to the public key registering section 140.

The private key storage section 130 stores the private key generated by the key generator 120, As the private key storage section 130, a part of a storage region of the memory 102 or a part of a storage region of the storage device 103 is used, for example.

The public key registering section 140 executes a process of registering the public key in the CA server 500. For example, the public key registering section 140 transmits a registration request including the public key to the CA server 500.

The signature verification requesting section 150 transmits, to the verifier terminal 600, a signature verification request to verify the signature of the document (final version document) created by the company A. The signature verification requesting section 150 receives, from the verifier terminal 600, the "seed" that is the random number generated by the verifier terminal 600, for example. For example, the verifier terminal 600 transmits the "seed" having, affixed thereto, a signature of the verifier 41 to the signature verification requesting section 150. In this case, the signature verification requesting section 150 acquires a certificate for the signature of the verifier 41 from the CA server 500 and verifies the validity of the signature affixed to the "seed". The signature verification requesting section 150 transmits the acquired "seed" to the signature generator 170.

The hash value calculator 160 calculates hash values of the two levels based on the original document. For example, the hash value calculator 160 generates a random number and calculates a first-level hash value based on the original document and the generated random number. The hash value calculator 160 calculates, based on the first-level hash value and the "seed", a second-level hash value to be used in the hash chain. The hash value calculator 160 transmits the second-level hash value to the signature generator 170. The hash value calculator 160 transmits the original document, the first-level hash value, the second-level hash value to the original document information transmitter 180.

The signature generator 170 generates a signature for the original document. For example, the signature generator 170 acquires the private key from the private key storage section 130. The signature generator 170 treats, as the signature for the original document, an encrypted text obtained by using the private key to encrypt the second-level hash value. The signature generator 170 transmits the created signature to the original document information transmitter 180.

The original document information transmitter 180 transmits the original document and the second-level hash value to the reviewer terminal 200a. The original document information transmitter 180 transmits the original document and the signature of the original document to the document storage server 400. Therefore, a combination of the original document and the signature is stored in the document storage server 400, The original document information transmitter 180 transmits the signature of the original document and the first-level hash value to the agent terminal 300.

The original document disclosing section 190 executes a process of disclosing the original document. For example, upon receiving the request to disclose the original document from the verifier terminal 600, the original document disclosing section 190 receives, from the document creator 30, input indicating whether the original document is permitted to be disclosed. When the input indicating that the original document is permitted to be disclosed is performed, the original document disclosing section 190 acquires the original document and the signature for the original document from the document storage server 400. The original document disclosing section 190 transmits the original document and the signature to the verifier terminal 600.

Figure 13:
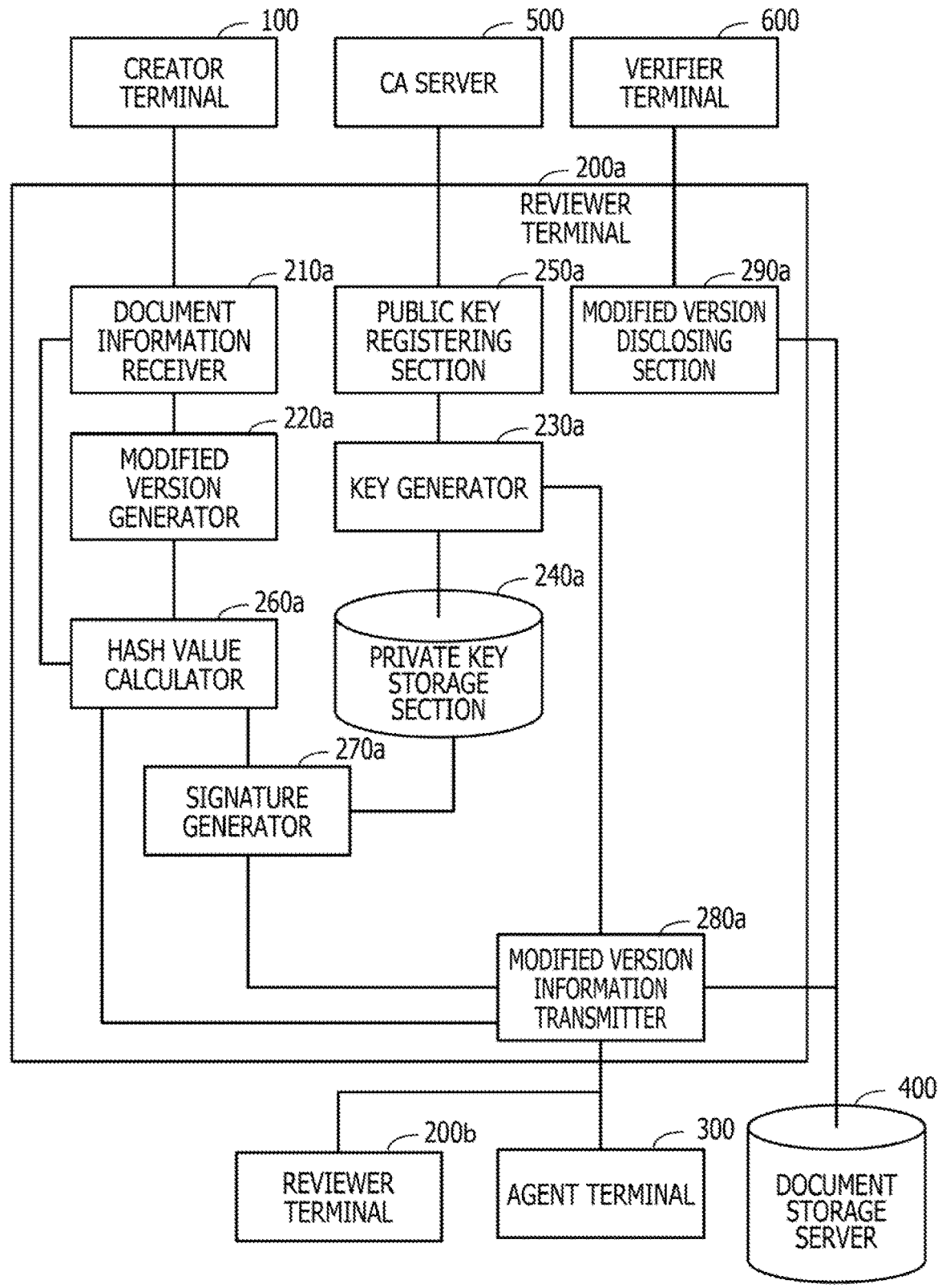
FIG. 13 is a block diagram illustrating an example of functions of a reviewer terminal used by a first reviewer.

FIG. 13 is a block diagram illustrating an example of functions of the reviewer terminal used by the first reviewer. The reviewer terminal 200a includes a document information receiver 210a, a modified version generator 220a, a key generator 230a, a private key storage section 240a, a public key registering section 250a, a hash value calculator 260a, a signature generator 270a, a modified version information transmitter 280a, and a modified version disclosing section 290a.

The document information receiver 210a acquires, from the creator terminal 100, the original document and the second-level hash value for the original document. The document information receiver 210a transmits the acquired document to the modified version generator 220a. The document information receiver 210a transmits the acquired hash value to the hash value calculator 260a.

The modified version generator 220a modifies the document based on input from the reviewer 31 to create a modified version document. The modified version generator 220a transmits the created modified version document to the hash value calculator 260a.

The key generator 230a generates a pair of a private key to be used to affix a signature to the modified version document and a public key to be used to verify the signature. The key generator 230a causes the generated private key to be stored in the private key storage section 240a. The key generator 230a transmits the generated public key to the public key registering section 250a.

The private key storage section 240a stores the private key generated by the key generator 230a. As the private key storage section 240a, a part of a storage region of a memory included in the reviewer terminal 200a or a part of the storage region of the storage device is used, for example.

The public key registering section 250a executes a process of registering the public key in the CA server 500. For example, the public key registering section 250a transmits a registration request including the public key to the CA server 500.

The hash value calculator 260a calculates hash values of the two levels based on the modified version document. For example, the hash value calculator 260a generates a random number and calculates a first-level hash value based on the modified version document and the generated random number. The hash value calculator 260a calculates, based on the first-level hash value and the second-level hash value for the original document, a second-level hash value to be used in the hash chain. The hash value calculator 260a transmits the second-level hash value to the signature generator 270a. The hash value calculator 260a transmits the modified version document, the first-level hash value, and the second-level hash value to the modified version information transmitter 280a.

The signature generator 270a generates a signature for the modified version document. For example, the signature generator 270a acquires the private key from the private key storage section 240a. The signature generator 270a treats, as the signature for the modified version document, an encrypted text obtained by using the private key to encrypt the second-level hash value. The signature generator 270a transmits the created signature to the modified version information transmitter 280a.

The modified version information transmitter 280a transmits the modified version document and the second-level hash value to the reviewer terminal 200b. The modified version information transmitter 280a transmits the modified version document and the signature of the modified version document to the document storage server 400. Therefore, a combination of the modified version document and the signature is stored in the document storage server 400. The modified version information transmitter 280a transmits the signature of the modified version document and the first-level hash value to the agent terminal 300.

The modified version disclosing section 290a executes a process of disclosing the modified version document. For example, upon receiving a request to disclose the modified version document from the verifier terminal 600, the modified version disclosing section 290a receives, from the reviewer 31, input indicating whether the modified version document is permitted to be disclosed. When the input indicating that the original document is permitted to be disclosed is performed, the modified version disclosing section 290a acquires the modified version document and the signature for the modified version document from the document storage server 400. The modified version disclosing section 290a transmits the modified version document and the signature to the verifier terminal 600.

Each of the reviewer terminals 200b, . . . , and 200n of the second and later reviewers has the same functions as those of the reviewer terminal 200a. However, the reviewer terminal 200n that creates the final version document does not transmit information to the other reviewer terminals.

Figure 14:
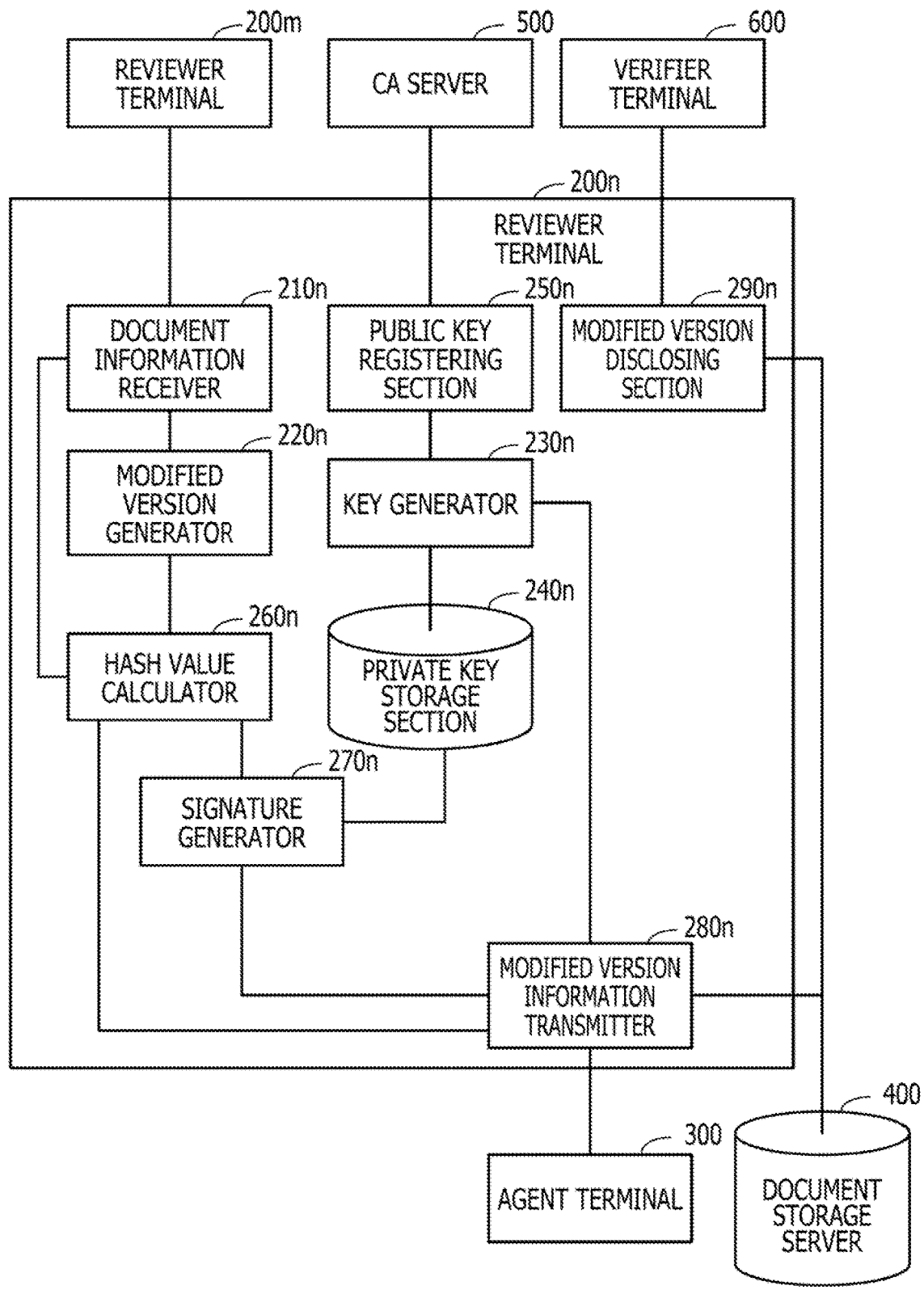
FIG. 14 is a block diagram illustrating an example of functions of a reviewer terminal that creates a final version document.

FIG. 14 is a block diagram illustrating an example of functions of the reviewer terminal that creates the final version document. The reviewer terminal 200n executes, based on the document received from the reviewer terminal 200m and the second-level hash value received from the reviewer terminal 200m, a process of creating the final version document, a process of signing the final version document, and the like.

The reviewer terminal 200n includes a document information receiver 210n, a modified version generator 220n, a key generator 230n, a private key storage section 240n, a public key registering section 250n, a hash value calculator 260n, a signature generator 270n, a modified version information transmitter 280n, and a modified version disclosing section 290n, Functions of the document information receiver 210n, the modified version generator 220n, the key generator 230n, the private key storage section 240n, the public key registering section 250n, the hash value calculator 260n, the signature generator 270n, and the modified version disclosing section 290n are the same as those of the sections illustrated in FIG. 13 and indicated by the same reference signs as those illustrated in FIG. 13.

The modified version information transmitter 280n transmits the final version document, the signature of the final version document, the first-level hash value, and the second-level hash value to the agent terminal 300. The modified version information transmitter 280n transmits the final version document and the signature of the final version document to the document storage server 400. Therefore, a combination of the final version document and the signature is stored in the document storage server 400.

Figure 15:
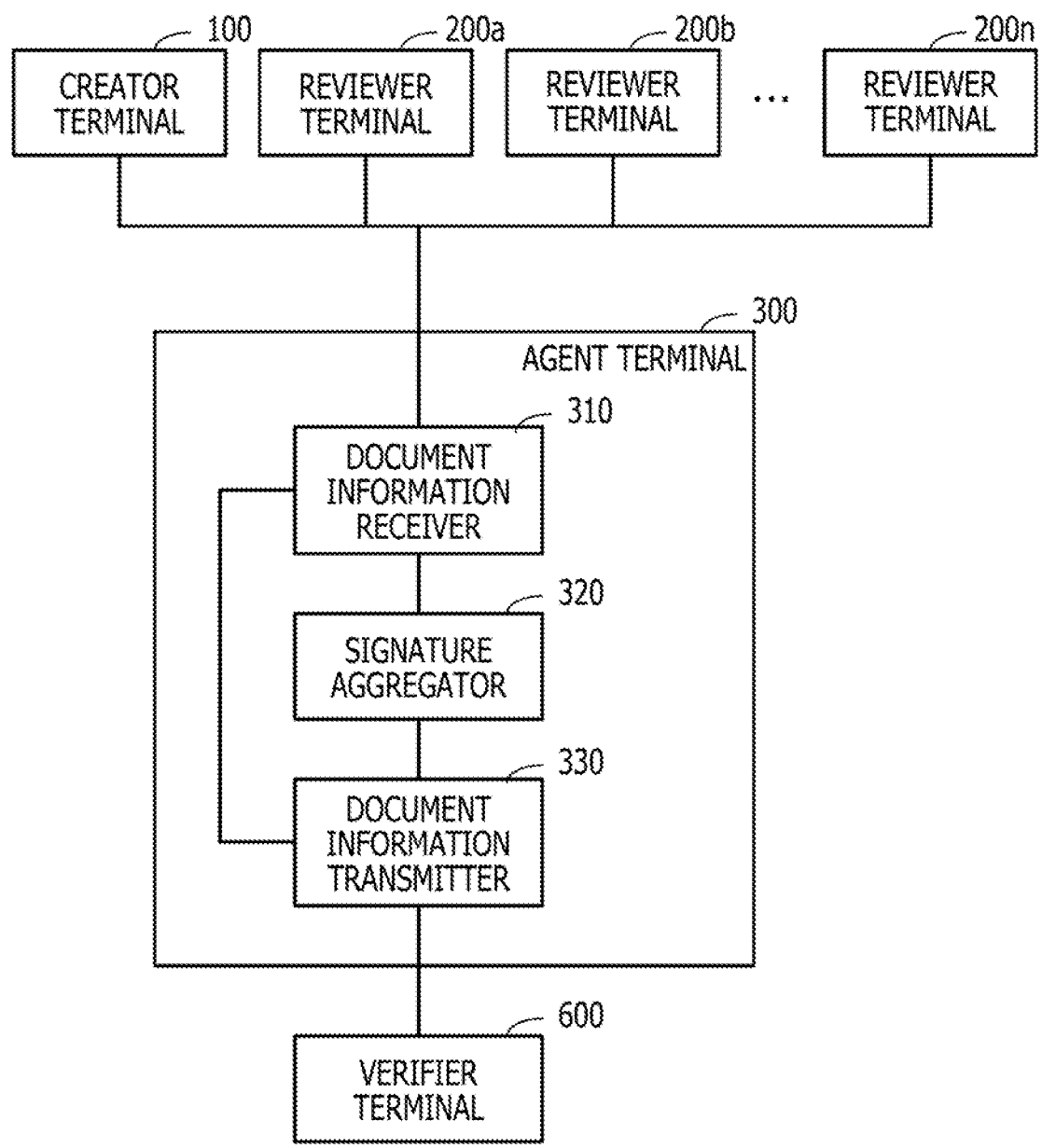
FIG. 15 is a block diagram illustrating an example of functions of an agent terminal.

FIG. 15 is a block diagram illustrating an example of functions of the agent terminal. The agent terminal 300 includes a document information receiver 310, a signature aggregator 320, and a document information transmitter 330.

The document information receiver 310 receives information transmitted by the creator terminal 100 and the reviewer terminals 200a, 200b, . . . , and 200n. For example, the document information receiver 310 receives the signature of the original document and the first-level hash value from the creator terminal 100. The document information receiver 310 receives the signatures of the modified version documents and the first-level hash values from the reviewer terminals 200a, 200b, . . . , and 200n. The document information receiver 310 receives the final version document and the second-level hash value from the reviewer terminal 200n that has created the final version document. The document information receiver 310 transmits the plurality of received signatures to the signature aggregator 320, The document information receiver 310 transmits the received information excluding the signatures to the document information transmitter 330.

The signature aggregator 320 aggregates the plurality of received signatures into a single aggregate signature by multi-signature. For example, when the plurality of signatures are Schnorr signatures (s, R), the signature aggregator 320 calculates the sum of values of "s" of the signatures and calculates the product of values of "R" of the signatures. The signature aggregator 320 creates an aggregate signature indicating a combination of the sum of "s" of the signatures and the product of "R" of the signatures. For example, when the received signatures are three signatures $(s_1, R_1)$, $(s_2, R_2)$, and $(s_3, R_3)$, the aggregate signature is $(s_1+s_2+s_3, R_1R_2R_3)$. The signature aggregator 320 transmits the aggregate signature to the document information transmitter 330.

The document information transmitter 330 transmits, to the verifier terminal 600, the aggregate signature, the first-level hash value for the original document, the first-level hash values for the modified version documents, the second-level hash value for the final version document, the final version document, and the random numbers used to generate the first-level hash values.

Figure 16:
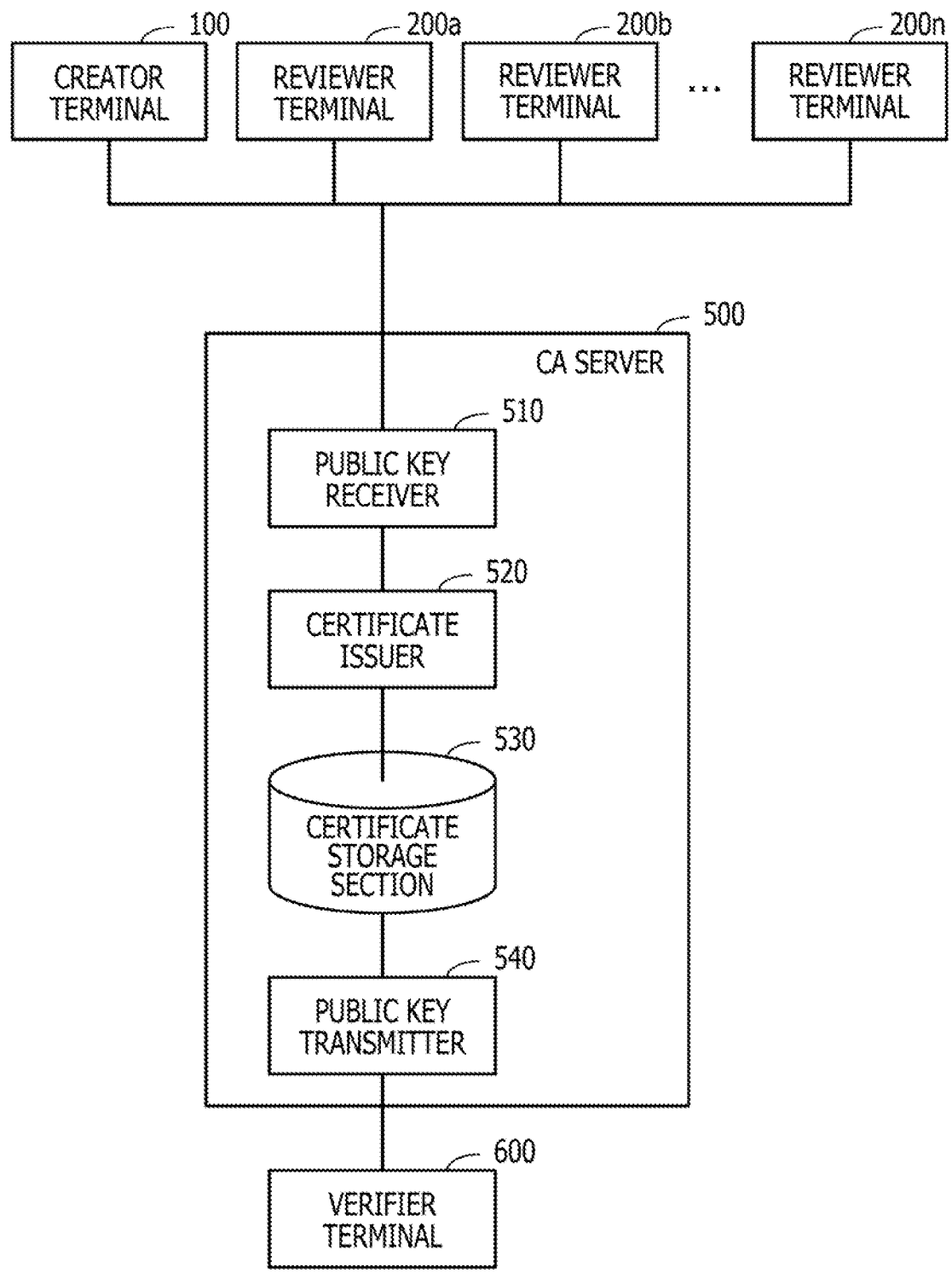
FIG. 16 is a block diagram illustrating an example of functions of a CA server.

FIG. 16 is a block diagram illustrating an example of functions of the CA server. The CA server 500 includes a public key receiver 510, a certificate issuer 520, a certificate storage section 530, and a public key transmitter 540.

The public key receiver 510 receives registration requests including the public keys from the creator terminal 100 and the plurality of reviewer terminals 200a, 200b, . . . , and 200n. The public key receiver 510 transmits the public keys included in the received registration requests to the certificate issuer 520.

The certificate issuer 520 generates the certificate for the public keys of the document creator and the reviewers. For example, the certificate issuer 520 generates an encrypted text by using a private key of the CA to encrypt the public keys and owner information indicating the document creator and the reviewers and treats the encrypted text generated by the encryption as a signature of the CA. The certificate issuer 520 generates the certificate including the owner information, the public keys, and the signature of the CA. The certificate issuer 520 causes the generated certificate to be stored in the certificate storage section 530.

The certificate storage section 530 stores the certificate for the public keys of the document creator and the reviewers. For example, as the certificate storage section 530, a part of a storage region of a memory of the CA server 500 or a part of the storage region of the storage device is used.

The public key transmitter 540 acquires, from the certificate storage section 530, the certificate for the public keys of the document creator and the reviewers in accordance with a request from the verifier terminal 600. The public key transmitter 540 transmits the acquired certificate to the verifier terminal 600.

Figure 17:
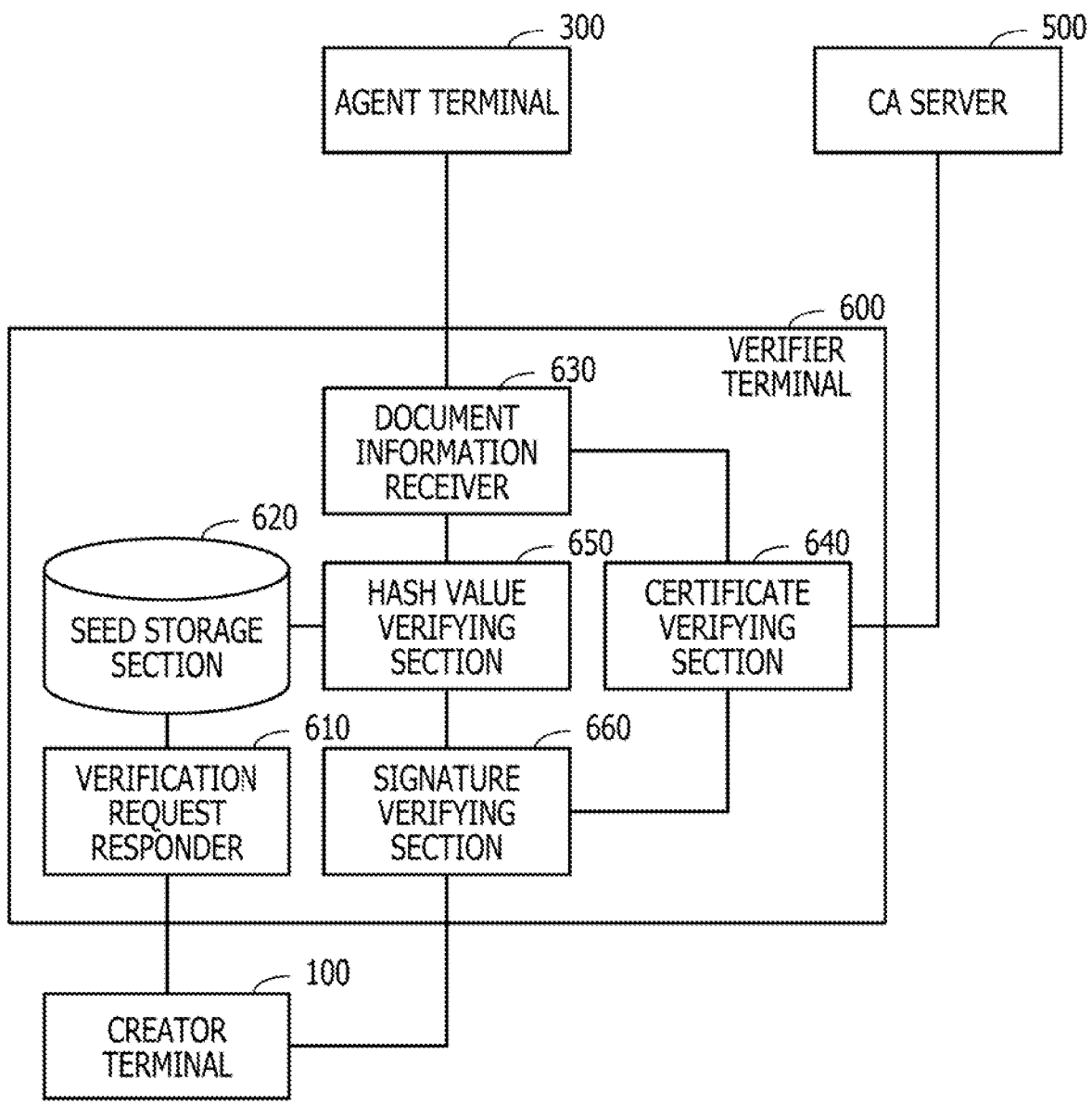
FIG. 17 is a block diagram illustrating an example of functions of a verifier terminal.

FIG. 17 is a block diagram illustrating an example of functions of the verifier terminal. The verifier terminal 600 includes a verification request responder 610, a seed storage section 620, a document information receiver 630, a certificate verifying section 640, a hash value verifying section 650, and a signature verifying section 660.

The verification request responder 610 responds to a signature verification request from the creator terminal 100. For example, upon receiving the signature verification request, the verification request responder 610 generates a random number and treats the generated random number as the "seed". The verification request responder 610 transmits a signature verification response including the "seed" to the creator terminal 100. The verification request responder 610 causes the generated "seed" to be stored in the seed storage section 620.

The seed storage section 620 stores the "seed" (random number). For example, as the seed storage section 620, a part of a storage region of a memory of the verifier terminal 600 or a part of the storage region of the storage device is used.

The document information receiver 630 receives, from the agent terminal 300, information to be used to verify the document. For example, the document information receiver 630 receives, from the agent terminal 300, the aggregate signature, the first-level hash value for the original document, the first-level hash values for the modified version documents, the second-level hash value for the final version document, the final version document, and the random number used to generate the first-level hash value for the final version document.

The certificate verifying section 640 acquires the certificate including the public keys of the document creator and the reviewers from the CA server 500 and verifies the validity of the certificate. For example, the certificate verifying section 640 acquires the public key of the CA from the CA server 500. The certificate verifying section 640 uses the public key of the CA to decrypt the CA's signature included in the certificate. The certificate verifying section 640 verifies whether information obtained by the decryption matches the owner information included in the certificate and the public keys included in the certificate. When the information matches the owner information and the public keys as a result of the verification, the certificate verifying section 640 certifies that the public keys included in the acquired certificate are owned by the owners indicated in the certificate.

The hash value verifying section 650 verifies the second-level hash value (value calculated in the hash chain) for the final version document received by the document information receiver 630. For example, the hash value verifying section 650 acquires the "seed" from the seed storage section 620. The hash value verifying section 650 uses the first-level hash value for the original document, the first-level hash values for the modified version documents, the final version document, and the random number used to generate the first-level hash value for the final version document to calculate a value of the hash chain based on the "seed" according to the procedure illustrated in FIG. 10. The hash value verifying section 650 determines whether the calculated value of the hash chain matches the second-level hash value for the final version document received by the document information receiver 630. When the value of the hash chain matches the second-level hash value for the received final version document, the hash value verifying section 650 certifies that the hash value is valid.

When the hash value verifying section 650 certifies that the hash value is valid, the hash value verifying section 650 transmits, to the signature verifying section 660, the second-level hash values for the documents that have been calculated in the calculation of the hash chain.

The signature verifying section 660 verifies the signatures of the document creator and the reviewers. For example, the signature verifying section 660 uses the second-level hash values for the documents, the aggregate signature, and the public keys of the document creator and the reviewers to verify that the foregoing Equation (3) is satisfied. When the signature verifying section 660 verifies that Equation (3) is satisfied, the signature verifying section 660 notifies the creator terminal 100 that the signature verification has been successfully executed.

Since the devices have the functions illustrated in FIGS. 12 to 17, a plurality of signatures may be verified without the disclosure of a document being modified. Lines that couple the sections indicating the functions illustrated in FIGS. 12 to 17 are some of communication lines. A communication line other than the communication lines illustrated may be set. The functions of the sections illustrated in FIGS. 12 to 17 may be achieved by causing a computer to execute program modules corresponding to the sections, for example.

[Signature and Verification Procedures]

Procedures for signing documents and a procedure for verifying a signature are described below with reference to FIGS. 18 to 22. A process of generating the private and public keys by the creator terminal 100 and the reviewer terminals 200a, 200b, . . . , and 200n, a process of storing the private keys, and a process of registering the public keys in the CA server 500 are omitted from FIGS. 18 to 22. Each of the creator terminal 100 and the reviewer terminals 200a, 200b, . . . , and 200n generates a private key and a public key and registers the public key in the CA server 500 before creating a signature in processes illustrated in FIGS. 18 to 22. Therefore, a group "L=$X_1$, $X_2$, . . . , and $X_N$" of the public keys is registered in the CA server 500.

Figure 18:
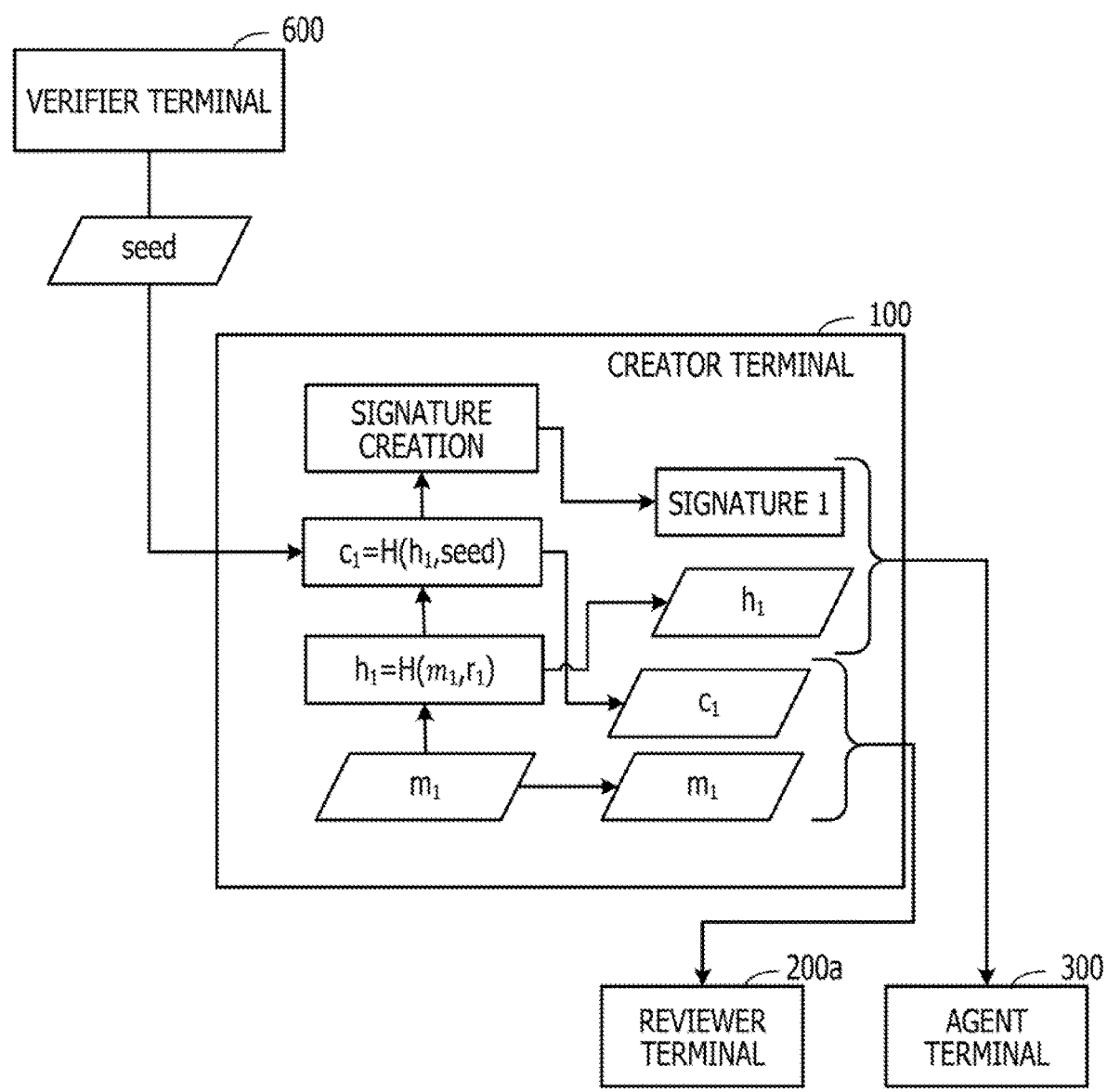
FIG. 18 illustrates an example of a signature procedure by the creator terminal.

FIG. 18 illustrates an example of a signature procedure by the creator terminal. The original document generator 110 of the creator terminal 100 creates the original document "$m_1$" based on the input from the document creator 30. The hash value calculator 160 generates the random number "$r_1$". The hash value calculator 160 uses the generated random number "$r_1$" and the original document "$m_1$" to calculate the first-level hash value "$h_1=H(m_1, r_1)$". The hash value calculator 160 uses the first-level hash value "$h_1$" and the "seed" acquired from the verifier terminal 600 to calculate the second-level hash value "$c_1=H(h_1, seed)$" to be used in the hash chain. The signature generator 170 generates an encrypted text by using the private key of the document creator 30 to encrypt the hash value "$c_1$" and treats the encrypted text as the signature "signature 1" of the document creator 30.

The original document information transmitter 180 transmits the original document "$m_1$" and the second-level hash value "$c_1$" to the reviewer terminal 200a. The original document information transmitter 180 transmits the signature "signature 1" of the document creator 30 and the first-level hash value "$h_1$" to the agent terminal 300.

Figure 19:
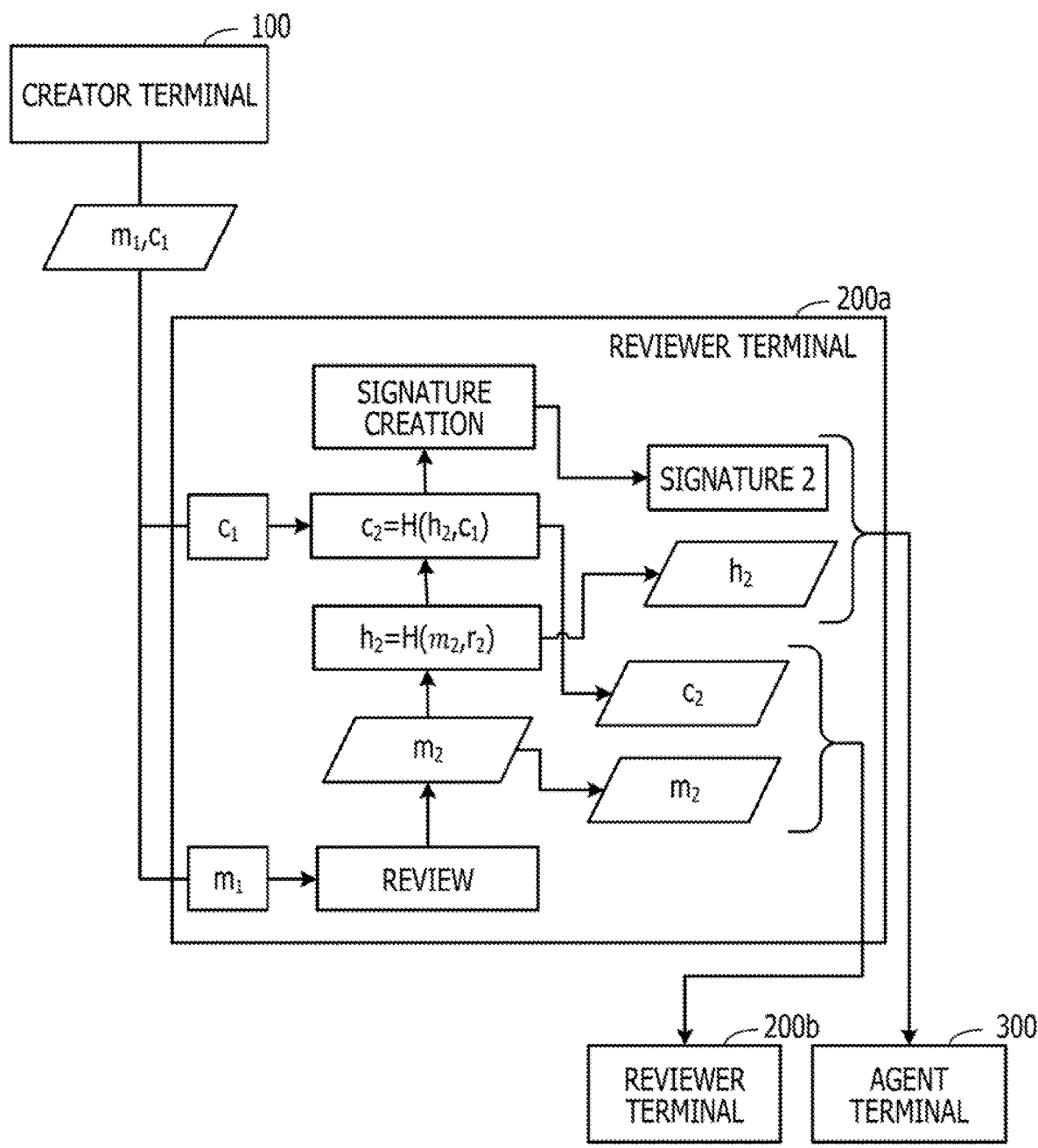
FIG. 19 illustrates an example of a signature procedure by the reviewer terminal used by the first reviewer.

FIG. 19 illustrates an example of a signature procedure by the reviewer terminal used by the first reviewer. When the reviewer terminal 200a receives the original document "$m_1$" and the second-level hash value "$c_1$" from the creator terminal 100, the modified version generator 220a creates the modified version document "$m_2$" based on input performed by the reviewer 31 for review. The hash value calculator 260a generates the random number "$r_2$". The hash value calculator 260a uses the generated random number "$r_2$" and the modified version document "$m_2$" to calculate the first-level hash value "$h_2=H(m_2, r_2)$". The hash value calculator 260a uses the first-level hash value "$h_2$" and the hash value "$c_1$" acquired from the creator terminal 100 to calculate the second-level hash value "$c_2=H(h_2, c_1)$" to be used in the hash chain. The signature generator 270a generates an encrypted text by using the private key of the reviewer 31 to encrypt the hash value "$c_2$" and treats the encrypted text as the signature "signature 2" of the reviewer 31.

The modified version information transmitter 280a transmits the modified version document "$m_2$" and the second-level hash value "$c_2$" to the reviewer terminal 200b used by the next reviewer 32. The modified version information transmitter 280a transmits the signature "signature 2" of the reviewer 31 and the first-level hash value "$h_2$" to the agent terminal 300.

After that, the same signature process as that illustrated in FIG. 19 is executed by each of the reviewer terminals 200b, . . . of the reviewers 32, . . . A destination of information generated by the reviewer terminal 200n used by the last reviewer 3n is different from destinations of information generated by the other reviewer terminals 200a, 200b, . . . .

Figure 20:
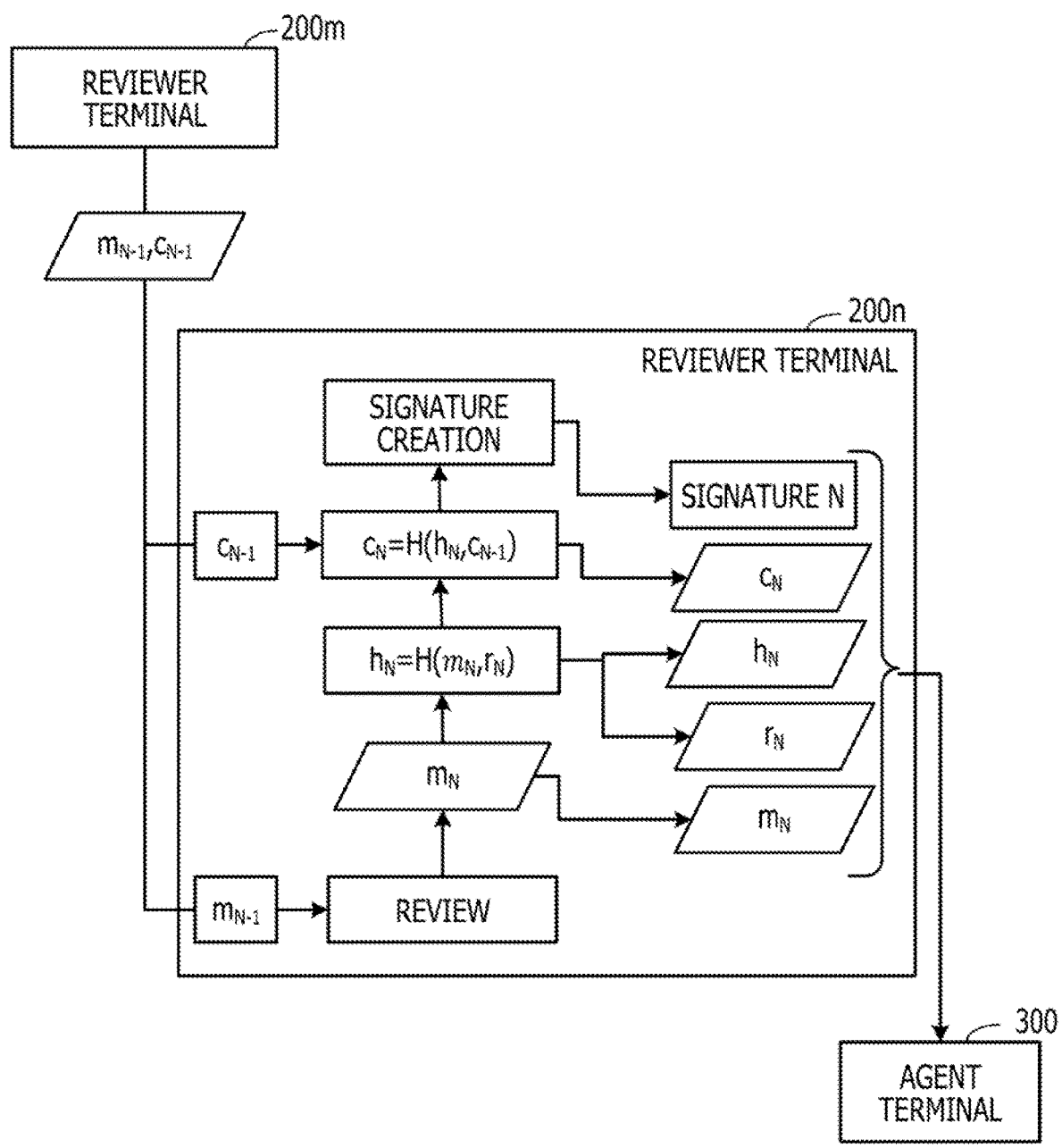
FIG. 20 illustrates an example of a signature procedure by the reviewer terminal that creates the final version document.

FIG. 20 illustrates an example of a signature procedure by the reviewer terminal that creates the final version document. When the reviewer terminal 200n receives the modified version document "$m_{N-1}$" and the second-level hash value "$c_{N-1}$" from the reviewer terminal 200m, the modified version generator 220n creates the modified version document "$m_N$" based on input performed by the reviewer 3n for review. Then, the hash value calculator 260n generates the random number "$r_N$". The hash value calculator 2601 uses the generated random number "$r_N$" and the modified version document "$m_N$" to calculate the first-level hash value "$h_N$=H($m_N$, $r_N$)". The hash value calculator 260n uses the first-level hash value "$h_N$" and the hash value "$c_{N-1}$" acquired from the reviewer terminal 200m to calculate the second-level hash value "$c_N$=($h_N$, $c_{N-1}$)" to be used in the hash chain. The signature generator 270a generates an encrypted text by using the private key of the reviewer 3n to encrypt the hash value "$c_N$" and treats the encrypted text as the signature "signature N" of the reviewer 3n.

The modified version information transmitter 280n transmits the signature "signature N" of the reviewer 3n, the second-level hash value "$c_N$", the first-level hash value "$h_N$", the random number "$r_N$" used to generate the first-level hash value "$h_N$", and the final version document "$m_N$" to the agent terminal 300.

Figure 21:
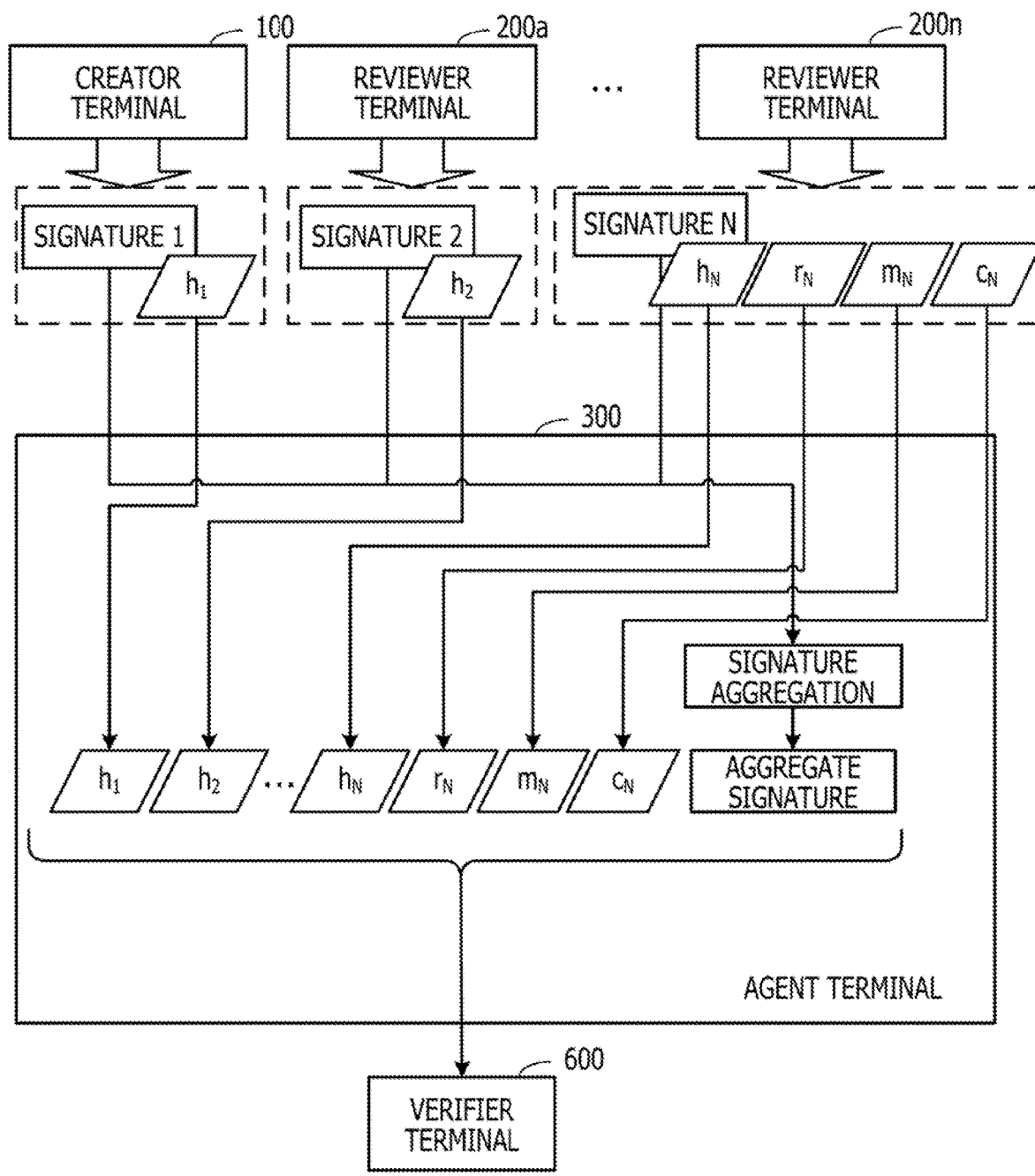
FIG. 21 illustrates an example of a procedure for a signature aggregation process by the agent terminal.

FIG. 21 illustrates an example of a procedure for a signature aggregation process by the agent terminal. When the document information receiver 310 of the agent terminal 300 acquires information from the creator terminal 100 and the reviewer terminals 200a, . . . , and 200n, the signature aggregator 320 aggregates the signatures "signature 1, signature 2, . . . , and signature N" into a single aggregate signature to create the aggregate signature. The document information transmitter 330 transmits the first-level hash values "$h_1$, $h_2$, . . . , and $h_N$", the random number "$r_N$" used to generate the hash value "$h_N$", the final version document "$m_N$", the second-level hash value "$c_N$" for the final version document, and the aggregate signature to the verifier terminal 600.

Figure 22:
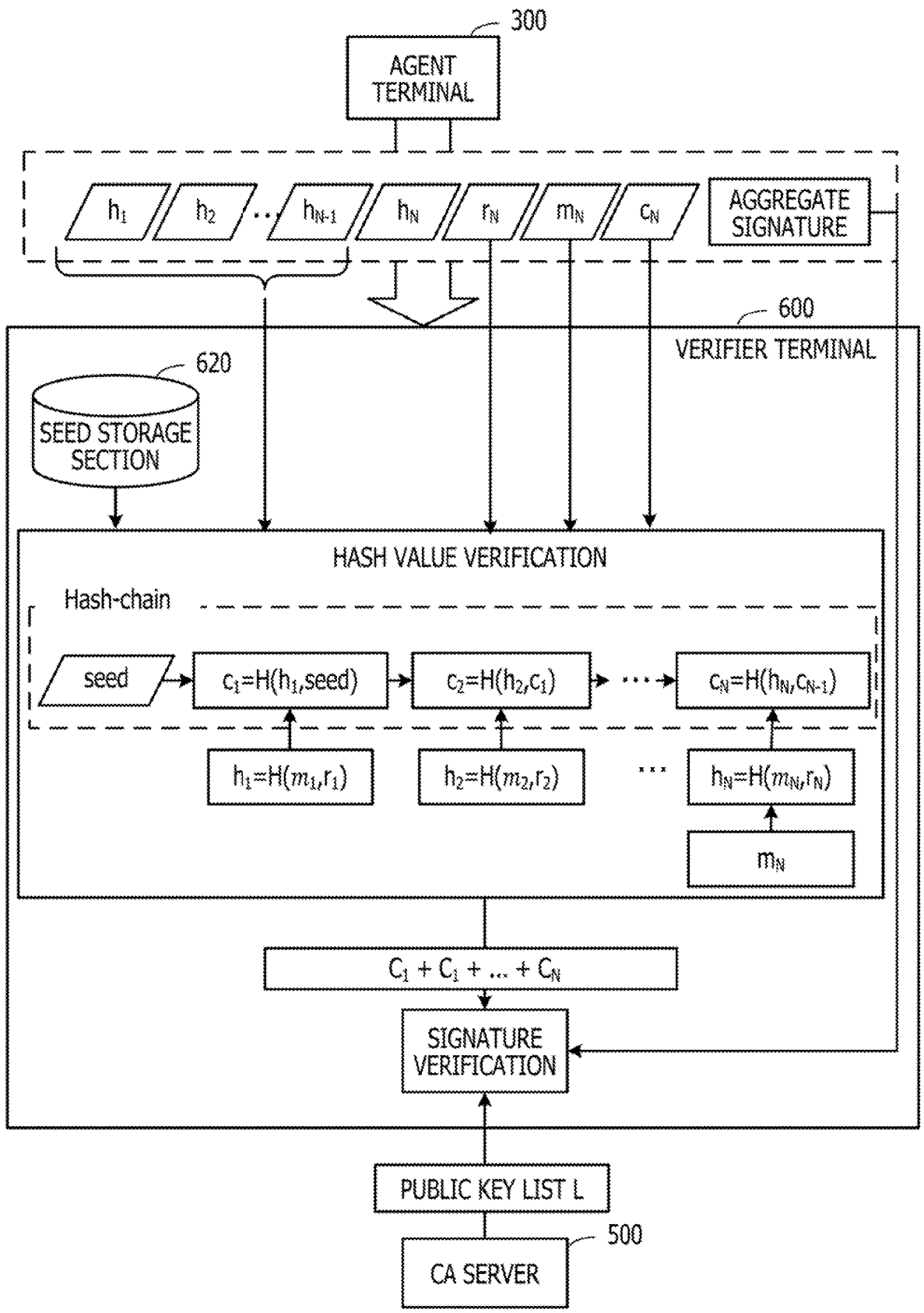
FIG. 22 illustrates an example of a procedure for a verification process by the verifier terminal.

FIG. 22 illustrates an example of a procedure for a verification process by the verifier terminal. The document information receiver 630 of the verifier terminal 600 receives the information from the agent terminal 300. After that, the hash value verifying section 650 uses the "seed", the first-level hash values "$h_1$, $h_2$, . . . ", the random number "$r_N$", and the final version document "$m_N$" to calculate the hash value "$c_N$" of the hash chain. The hash value verifying section 650 verifies whether the calculated hash value "$c_N$" is equal to the hash value "$c_N$" acquired from the agent terminal 300.

The certificate verifying section 640 acquires a public key list L from the CA server 500 and uses the public key of the CA to verify the certificate for the public keys, included in the public key list L, of the document creator 30 and the reviewers 31, 32, . . . , and 3n. When the certificate verifying section 640 confirms that the public keys of the document creator 30 and the reviewers 31, 32, . . . , and 3n are valid, the signature verifying section 660 verifies the aggregate signature. To verify the aggregate signature, the public keys of the document creator 30 and the reviewers 31, 32, . . . , and 3n and the hash values "$c_1$, $c_2$, . . . , and $c_N$" generated in the calculation of the hash value "$c_N$" are used.

In this manner, the verifier terminal 600 may verify that the final version document has been created by the valid original document creator and reviewed by the valid reviewers, without the disclosure of the documents other than the final version document to the verifier 41

[Verification of Specific Modified Version Document]

The verifier terminal 600 may verify a predetermined modified version document specified by the verifier 41.

Figure 23:
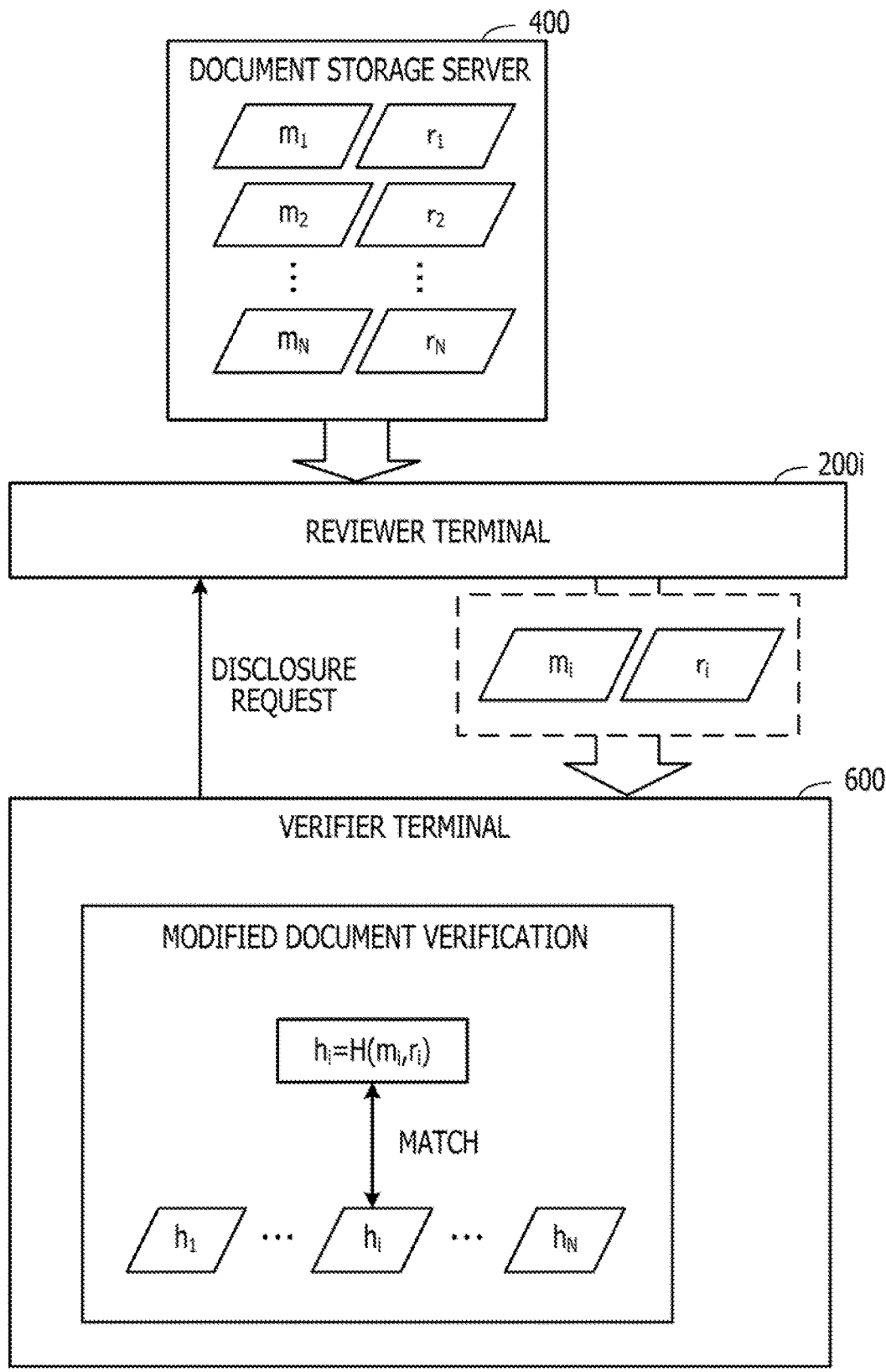
FIG. 23 illustrates an example of a process of verifying a specific modified version document by the verifier terminal.

FIG. 23 illustrates an example of a process of verifying a specific modified version document by the verifier terminal. The document information receiver 630 of the verifier terminal 600 transmits, in accordance with input from the verifier 41, a request to disclose a specific modified version document to a reviewer terminal 200i that has created the predetermined modified version document. When approval for disclosure is input by a reviewer to the reviewer terminal 200i, the reviewer terminal 200i acquires the modified version document "$m_i$" and a random number "$r_i$" used to calculate a first-level hash value from the document storage server 400. The reviewer terminal 200i uses a safe communication line in Secure Sockets Layer (SSL)/Transport Layer Security (TLS) communication or the like to transmit the modified version document "$m_i$" and the random number "$r_i$" to the verifier terminal 600.

The document information receiver 630 of the verifier terminal 600 receives the modified version document "$m_i$" and the random number "$r_i$" and transmits information of the modified version document "$m_i$" and the random number "$r_i$" to the hash value verifying section 650. The hash value verifying section 650 verifies whether the hash value "$h_i$" calculated based on the modified version document "$m_i$" and the random number "$r_i$" matches a hash value "$h_i$" acquired from the agent terminal 300. When the verifier terminal 600 confirms that $h_i$=H($m_i$, $r_i$), the verifier terminal 600 has confirmed the validity of the arbitrary modified version document "$m_i$". Since the signature verification is already executed using the aggregate signature, each of the individual signatures is not verified.

[Specific Example of Signature Verification]

The signature verification process is described in detail with reference to FIGS. 24 to 27 using an example in which a document is divided into a plurality of blocks and each of the blocks is modified by reviewers.

Figure 24:
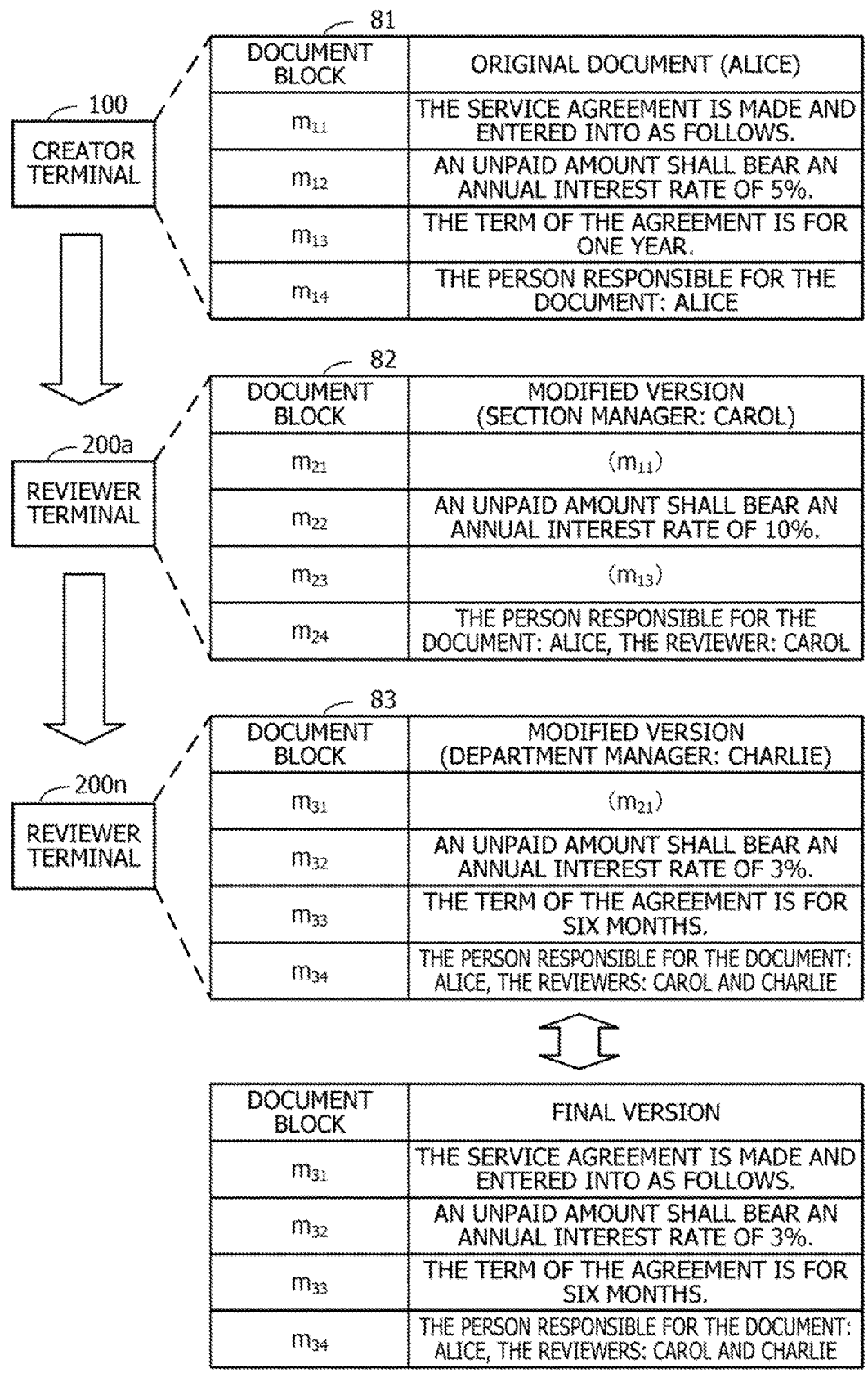
FIG. 24 illustrates an example of modifications to blocks of a document.

FIG. 24 illustrates an example of modifications to the blocks of the document. In this example, a document 81 created by the document creator 30 using the creator terminal 100 is divided into four document blocks $m_{11}$ to $m_{14}$, and the document creator 30 is "Alice". The divided document blocks state that "the service agreement is made and entered into as follows,", "an unpaid amount shall bear an annual interest rate of 5%.", "the term of the agreement is for one year.", and "the person responsible for the document: Alice".

"Carol" who is a section manager and "Charlie" who is a department manager review the document and modify details of some of the document blocks in order. For example, "Carol" who is the first reviewer 31 uses the reviewer terminal 200a to modify the document 81. For example, the document block "$m_{12}$" is modified to a document block indicating that "an unpaid amount shall bear an annual interest rate of 10%.", and the document block "$m_{14}$" is modified to a document block indicating "the person responsible for the document: Alice, the reviewer: Carol". Document blocks of a document 82 after the modifications are indicated by "$m_{21}$, $m_{22}$, $m_{23}$, and $m_{24}$".

"Charlie" who is the last reviewer $3n$ uses the reviewer terminal $200n$ to modify the document 82. For example, the document block "$m_{22}$" is modified to a document block indicating that "an unpaid amount shall bear an annual interest rate of 3%.", the document block "$m_{23}$" is modified to a document block indicating that "the term of the agreement is for 6 months,", and the document block "$m_{24}$" is modified to a document block indicating "the person responsible for the document: Alice, the reviewers: Carol and Charlie". Document blocks of a document 83 after the modifications are indicated by "$m_{31}$, $m_{32}$, $m_{33}$, and $m_{34}$".

The document 83 after "Charlie" reviews the document is a final version document. As a result, details of the final version document 83 are "the service agreement is made and entered into as follows.", "an unpaid amount shall bear an annual interest rate of 3%.", "the term of the agreement is for 6 months.", and "the person responsible for this document: Alice, the reviewers: Carol and Charlie".

In this case, information that is used by the verifier 41 to verify details of the document is only the final version document. The verifier 41, however, may want to confirm whether an unauthorized operation has been performed in the review procedure. In this case, when all the document blocks of the original document and the modified version documents are to be verified by the verifier terminal 600, all of the original document and the modified version documents may be disclosed to the verifier 41. In this case, information that is disadvantageous to the company A to which the document creator 30 and the reviewers 31, 32, . . . , and $3n$ belong may leak to the verifier.

In the second embodiment, the creator terminal 100 and the reviewer terminals $200a$, $200b$, . . . , and $200n$ calculate hash values of the two levels for each of the document blocks and form a hash chain of the second-level hash values. The creator terminal 100 and the reviewer terminals $200a$, $200b$, . . . , and $200n$ affix signatures for the second-level hash values.

FIG. 25 illustrates an example of information generated by the creator terminal and the reviewer terminals. Original document information 84 generated by the creator terminal 100 includes the document blocks of the original document, hash values for the document blocks, and signatures for the document blocks.

For example, the creator terminal 100 couples a random number "$r_{11}$" to the document block "$m_{11}$" so that the random number "$r_{11}$" immediately succeeds the document block "$m_{11}$". Then, the creator terminal 100 calculates a first-level hash value ha for "the service agreement . . . , $r_{11}$". The creator terminal 100 couples the "seed" to the first-level hash value $h_{11}$ so that the "seed" immediately succeeds the first-level hash value $h_{11}$. Then, the creator terminal 100 calculates a second-level hash value $c_{11}$, In the same manner as described above, the creator terminal 100 uses random numbers "$r_{12}$, $r_{13}$, and $r_{14}$" to calculate hash values of the two levels and generates first-level hash values "$h_{12}$, $h_{13}$, and $h_{14}$" and second-level hash values "$c_{12}$, $c_{13}$, and $c_{14}$" for the document blocks "$m_{12}$, $m_{13}$, and $m_{14}$".

The creator terminal 100 creates signatures "Sign($c_{11}$, Alice), Sign($c_{12}$, Alice), Sign($c_{13}$, Alice), and Sign($c_{14}$, Alice)" for the generated second-level hash values "$c_{11}$, $c_{12}$, $c_{13}$, and $c_{14}$". Sign(message, name) indicates that the "message" has been signed using a private key of the "name".

Modified version information 85 generated by the reviewer terminal $200a$ includes the document blocks of the first modified version document, hash values for the document blocks, and signatures for the document blocks.

For example, the reviewer terminal $200a$ couples a random number "$r_{22}$" to the document block "$m_{22}$" after the modification so that the random number "$r_{22}$" immediately succeeds the document block "$m_{22}$". Then, the creator terminal 100 calculates a first-level hash value $h_{22}$ for "an unpaid amount shall bear an annual interest rate of 10%, $r_{22}$". The reviewer terminal $200a$ couples the hash value "$c_{12}$" to the first-level hash value "$h_{22}$" so that the hash value "$c_{12}$" immediately succeeds the first-level hash value "$h_{22}$". Then, the creator terminal 100 calculates a second-level hash value "$c_{22}$". In the same manner as described above, the reviewer terminal $200a$ uses a random number "$r_{24}$" to calculate hash values of the two levels and generates a first-level hash value "$h_{24}$" and a second-level hash value "$c_{24}$" for the document block "$m_{24}$" after the modification.

The reviewer terminal $200a$ uses random numbers "$r_{21}$ and $r_{23}$" and the hash values "$c_{11}$ and $c_{13}$" to calculate first-level hash values "$h_{21}$ and $h_{23}$" and second-level hash values "$c_{21}$ and $c_{23}$" for the unmodified document blocks "$m_{21}$ and $m_{23}$" in the same manner as described above. The reviewer terminal $200a$ generates signatures "Sign($c_{21}$, Carol), Sign($c_{22}$, Carol), Sign($c_{23}$, Carol), and Sign($c_{24}$, Carol)" for the generated second-level hash values "$c_{21}$, $c_{22}$, $c_{23}$, and $c_{24}$". The reviewer terminal $200a$ may treat the hash values "$c_{11}$ and $c_{13}$" as the second-level hash values "$c_{21}$ and $c_{23}$" for the unmodified document blocks "$m_{21}$ and $m_{23}$".

Modified version information 86 generated by the reviewer terminal $200n$ includes the document blocks of the final modified version document, hash values for the document blocks, and signatures for the document blocks.

For example, the reviewer terminal $200n$ couples a random number "$r_{32}$" to the document block "$m_{32}$" after the modification so that the random number "$r_{32}$" immediately succeeds the document block "$m_{32}$". Then, the reviewer terminal $200n$ calculates a first-level hash value "$h_{32}$" for "an unpaid amount shall bear an annual interest rate of 3%, $r_{32}$". The reviewer terminal $200n$ couples the hash value "$c_{22}$" to the calculated hash value "$h_{32}$" so that the hash value "$c_{22}$" immediately succeeds the hash value "$h_{32}$". Then, the reviewer terminal $200n$ calculates a second-level hash value "$c_{32}$". In the same manner as described above, the reviewer terminal $200n$ uses random numbers "$r_{33}$ and $r_{34}$" to calculate hash values of the two levels and generates first-level hash values "$h_{33}$ and $h_{34}$" and second-level hash values "$c_{33}$ and $c_{34}$" for the document blocks "$m_{33}$ and $m_{34}$" after the modifications.

The reviewer terminal $200n$ uses a random number "$r_{31}$" and the hash value "$_{21}$" to calculate a first-level hash value "$h_{31}$" and a second-level hash value "$c_{31}$" for the unmodified document block "$m_{31}$" in the same manner as described above. The reviewer terminal $200n$ creates signatures "Sign ($c_{31}$, Charlie), Sign($c_{32}$, Charlie), Sign($c_{33}$, Charlie), and Sign($c_{34}$, Charlie)" for the generated second-level hash values "$c_{31}$, $c_{32}$, $c_{33}$, and $c_{34}$". The reviewer terminal $200n$ treats the hash value "$c_{21}$" as the second-level hash value "$c_{31}$" for the unmodified document block "$m_{31}$".

The information created and generated in the foregoing manner is transmitted to the agent terminal 300, and the signatures are aggregated.

FIG. 26 illustrates an example of the signature aggregation. The agent terminal 300 aggregates the signatures included in a group (signature group 87) of the signatures acquired from the creator terminal 100 and the reviewer terminals $200a$ and $200n$ for each of the document blocks, for example. The agent terminal 300 further aggregates aggregate signatures obtained by aggregating the signatures of the document blocks. By this aggregation, the signatures of the document creator and the reviewers for the document blocks are aggregated into a single aggregate signature 88.

Figure 27:
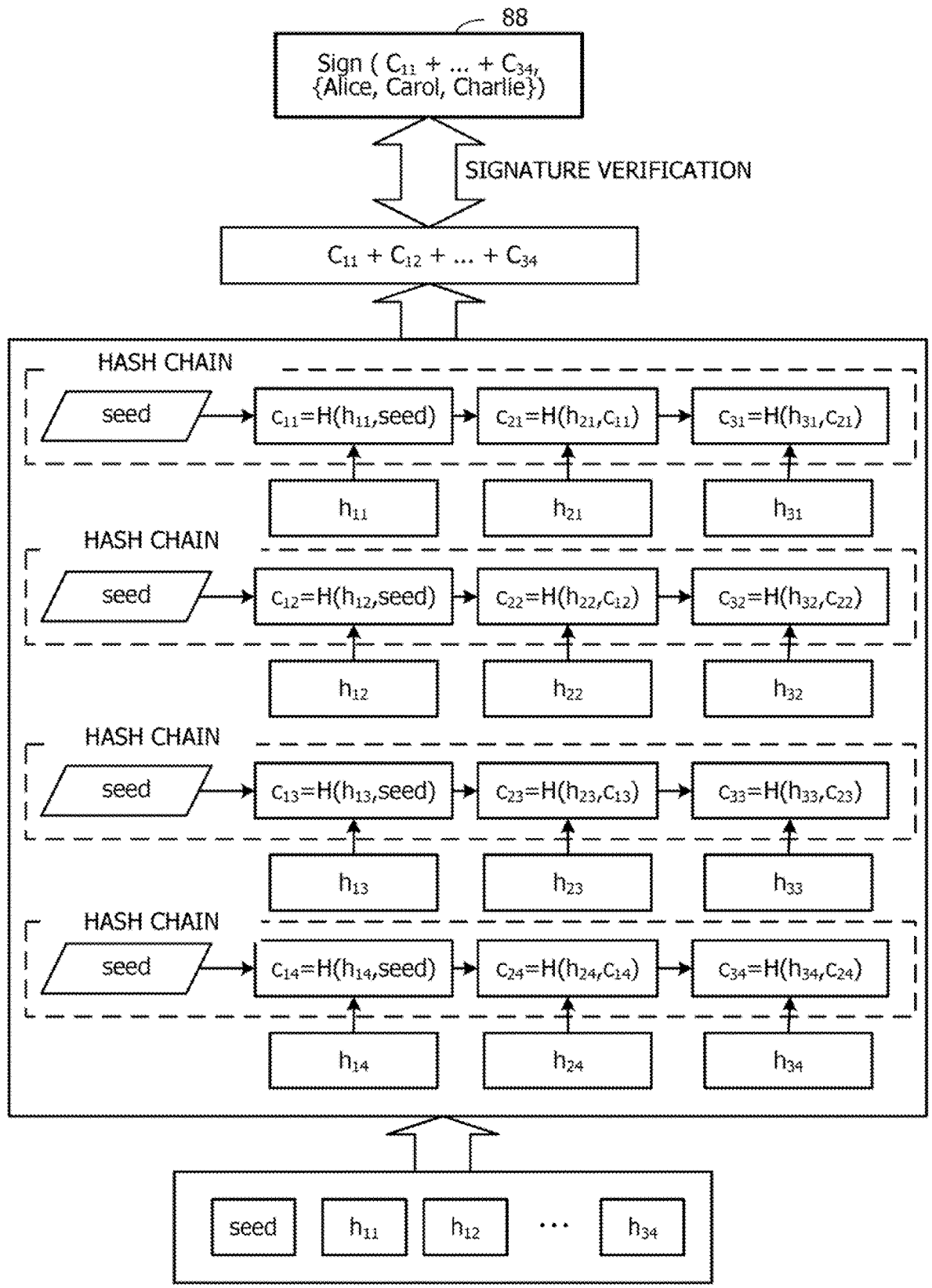
FIG. 27 illustrates an example of signature verification using hash chains.

FIG. 27 illustrates an example of signature verification using hash chains. The verifier terminal 600 calculates a hash chain for each of the document blocks and acquires the second-level hash values "$c_{11}, c_{12}, \ldots,$ and $c_{34}$". The verifier terminal 600 uses the second-level hash values "$c_{11}, c_{12}, \ldots,$ and $c_{34}$" to verify the aggregate signature.

When the verifier wants to verify an arbitrary modified version document, the verifier terminal 600 acquires the modified version document and a random number used to generate a first-level hash value for the modified version document and verifies that the first-level hash value is valid. For example, when the document 82 (refer to FIG. 24) is to be verified, the verifier terminal 600 acquires the document blocks "$m_{21}, m_{22}, m_{23},$ and $m_{24}$" and the random numbers "$r_{21}, r_{22}, r_{23},$ and $r_{24}$" and calculates the hash values "$h_{21}, h_{22}, h_{23},$ and $h_{24}$".

[Entire Flow of Signature Verification]

Next, the flow of the entire signature verification process is described with reference to FIGS. 28 and 29.

Figure 28:
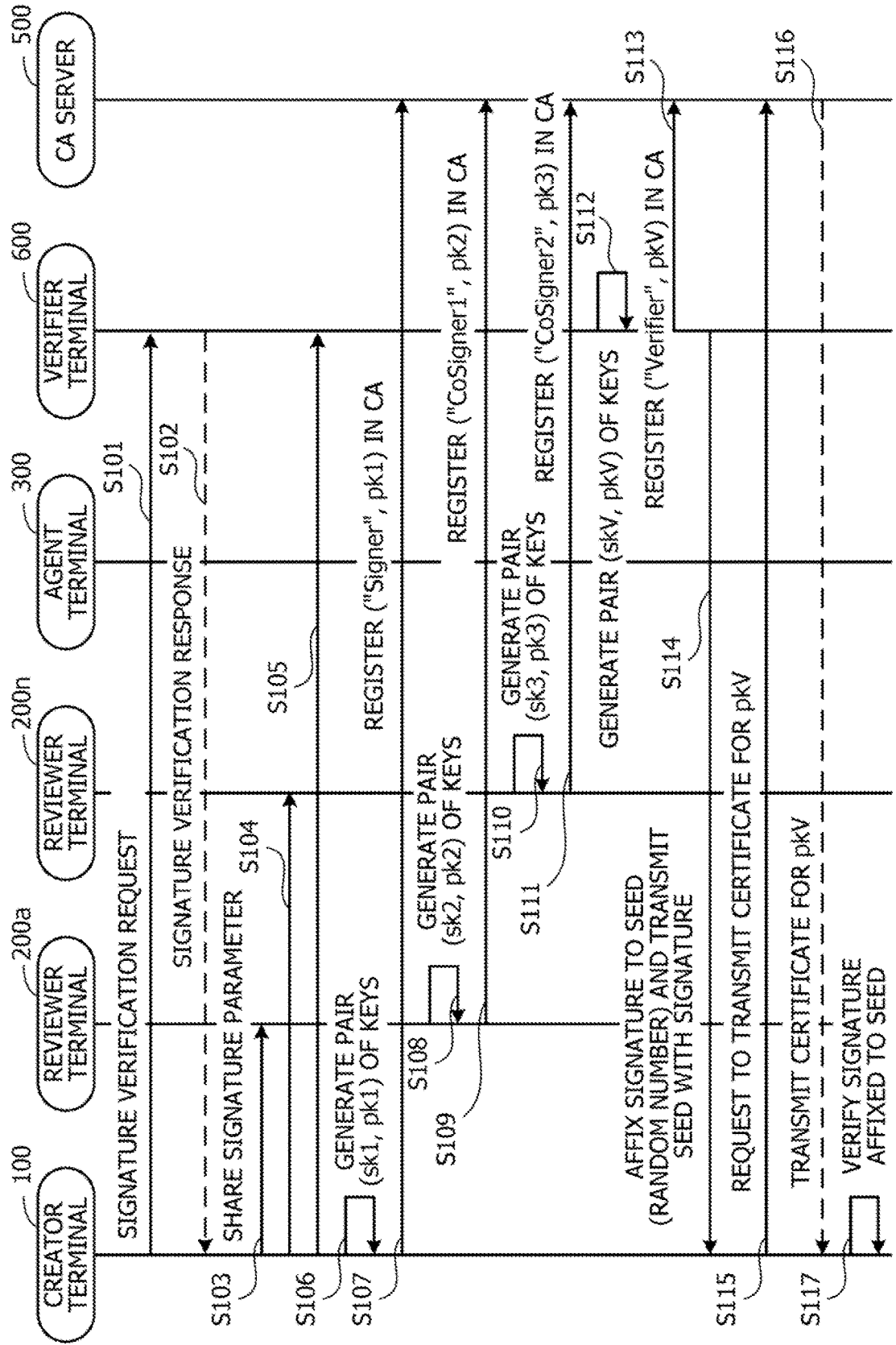
FIG. 28 is a first diagram illustrating an example of a procedure for a signature verification process.

FIG. 28 is a first diagram illustrating an example of a procedure for the signature verification process. The creator terminal 100 transmits a signature verification request to the verifier terminal 600 (step S101). The verifier terminal 600 transmits a signature verification response to the creator terminal 100 (step S102).

The creator terminal 100 shares a signature parameter with the reviewer terminals 200*a* and 200*n* and the verifier terminal 600 (steps S103 to S105). The signature parameter is a value of "q" to be used to calculate a public key "$X=g^x \pmod{q}$", for example.

The creator terminal 100 generates a pair (sk1, pk1) of a private key and a public key (step S106). The creator terminal 100 registers a name "Signer" of the document creator and the public key "pk1" in the CA server 500 (step S107).

The reviewer terminal 200*a* generates a pair (sk2, pk2) of a private key and a public key (step S108). The reviewer terminal 200*a* registers a name "CoSigner1" of the reviewer and the public key "pk2" in the CAserver 500 (step S109).

The reviewer terminal 200*n* generates a pair (sk3, pk3) of a private key and a public key (step S110). The reviewer terminal 200*n* registers a name "CoSigner2" of the reviewer and the public key "pk3" in the CA server 500 (step S111).

The verifier terminal 600 generates a pair (skV, pkV) of a private key and a public key (step S112). The verifier terminal 600 registers a name "Verifier" of the verifier and the public key "pkV" in the CA server 500 (step S113). The verifier terminal 600 generates a random number "seed" and transmits the random number "seed" with a verifier's signature affixed thereto to the creator terminal 100 (step S114).

The creator terminal 100 requests the CAserver 500 to transmit a certificate for the public key "pkV" of the verifier (step S115). The CA server 500 transmits the certificate for the public key "pkV" of the verifier to the creator terminal 100 (step S116). The creator terminal 100 uses the certificate for the public key "pkV" of the verifier to verify the signature affixed to the "seed" (step S117).

Figure 29:
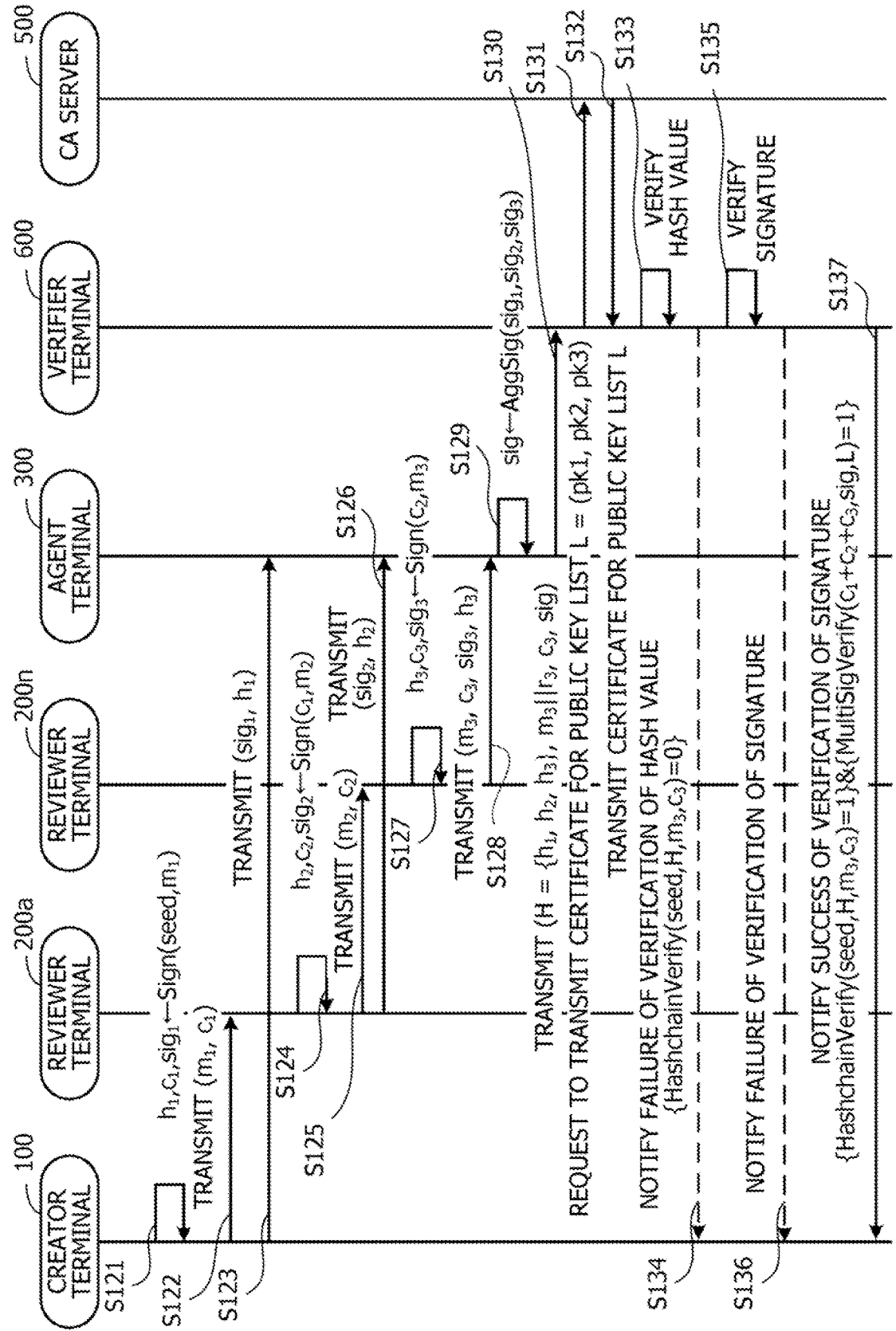
FIG. 29 is a second diagram illustrating the example of the procedure for the signature verification process.

FIG. 29 is a second diagram illustrating the example of the procedure for the signature verification process. The creator terminal 100 calculates the hash values $h_1$ and $c_1$ of the two levels and creates a signature "$sig_1 \leftarrow Sign(seed, m_1)$" for the "seed" and the original document "$m_1$" (step S121). The creator terminal 100 transmits the original document "$m_1$" and the second-level hash value "$c_1$" to the reviewer terminal 200*a* (step S122). The creator terminal 100 transmits the signature "$sig_1$" and the first-level hash value "$h_1$" to the agent terminal 300 (step S123).

The reviewer terminal 200*a* calculates the hash values $h_2$ and $c_2$ of the two levels and creates a signature "$sig_2 \leftarrow Sign(c_1, m_2)$" for "$h_1$" and the modified version document "$m_2$" (step S124). The reviewer terminal 200*a* transmits the modified version document "$m_2$" and the second-level hash value "$c_2$" to the reviewer terminal 200*n* (step S125). The reviewer terminal 200*a* transmits the signature "$sig_2$" and the first-level hash value "$h_2$" to the agent terminal 300 (step S126).

The reviewer terminal 200*n* calculates the hash values $h_3$, and $c_3$ of the two levels and creates a signature "$sig_3 \leftarrow Sign(c_2, m_3)$" for "$h_2$" and the modified version document "$m_3$" (step S127). The reviewer terminal 200*n* transmits the modified version document "$m_3$", the second-level hash value "$c_3$", the signature "$sig_3$", and the first-level hash value "$h_3$" to the agent terminal 300 (step S128).

The agent terminal 300 generates an aggregate signature "$sig \leftarrow AggSig(sig_1, sig_2, sig_3)$" by aggregating the signatures "$sig_1, sig_2,$ and $sig_3$" acquired from the creator terminal 100, the reviewer terminal 200*a*, and the reviewer terminal 200*n* (step S129). The agent terminal 300 transmits a set $H=\{h_1, h_2, h_3\}$ of the first-level hash values, the final version document "$m_3\|r_3$" with the random number "$r_3$" coupled thereto, the second-level hash value "$c_3$", and the aggregate signature "sig" to the verifier terminal 600 (step S130).

The verifier terminal 600 requests the CA server 500 to transmit a certificate for a public key list L(pk1, pk2, pk3) (step S131). The CA server 500 transmits the certificate for the public key list L(pk1, pk2, pk3) to the verifier terminal 600 (step S132). The verifier terminal 600 uses the "seed", the set H of the first-level hash values, and the document "$m_3\|r_3$" to verify the second-level hash value "$c_3$" (step S133). When the verifier terminal 600 fails to verify the hash value or when {HashchainVerify(seed, H, $m_3$, $c_3$)=0}, the verifier terminal 600 notifies information indicating the failure of the verification of the hash value to the creator terminal 100.

When the verifier terminal 600 successfully verifies the hash value or when {HashchainVerify(seed, H, $m_3$, $c_3$)=1}, the verifier terminal 600 verifies the aggregate signature "sig" (step S135). To verify the aggregate signature "sig", the verifier terminal 600 uses the sum ($c_1+c_2+c_3$) of the second-level hash values and the public key list L(pk1, pk2, pk3) certified based on the certificate. The second-level hash values "$c_1$ and $c_2$" are calculated in the verification of the hash values. When the verifier terminal 600 fails to verify the signature or when {MultiSigVerify($c_1+c_2+c_3$, sig, L)=0}, the verifier terminal 600 transmits information indicating the failure of the signature verification to the creator terminal 100 (step S136).

When the verifier terminal 600 successfully verifies the hash values and the signature (or when {HashchainVerify (seed, H, $m_3$, $c_3$)=1} and {MultiSigVerify($c_1+c_2+c_3$, sig, L)=1}), the verifier terminal 600 transmits information indicating the success of the verification to the creator terminal 100.

In the foregoing manner, the verifier terminal 600 may verify the aggregate signature including the signatures of the valid reviewers without the disclosure of the original document to the verifier terminal 600 or without the disclosure of the modified version documents other than the final version document to the verifier terminal 600.

For example, the verifier terminal 600 may confirm the validity of the modified version documents created in accordance with the valid flows and including the final version document in the verification of the hash chain without having the verifier 41 view texts of the modified version documents. The verifier terminal 600 may confirm the validity of the signatures affixed to the modified version documents in all the flows in the signature verification executed once without depending on the number of modifications. Therefore, the documents may be modified in a safe and efficient manner and the electronic signatures may be affixed to the documents in a safe and efficient manner.

When the verifier 41 obtains an agreement from an arbitrary reviewer, the verifier 41 may acquire a corresponding modified version document without leaking information on another modified version document. In this case, the verifier terminal 600 may verify the validity of a hash value by verifying the hash value. Therefore, a modified version document may be basically kept confidential and may be disclosed in the form in which the modified version document is not able to be falsified (altered) by a reviewer, only when the modified version document is used as evidence.

Other Embodiments

Although the second embodiment describes the example in which the Schnorr signatures are used in the signature aggregation, the aggregation may be executed using another signature method.

Although the document creator 30, the reviewers 31, 32, . . . , and 3n, and the agent 42 use the different terminal devices (computers), a single computer may be shared by two persons. For example, a single server may be shared by the document creator 30 and the reviewers 31, 32, . . . , and 3n. The document creator 30 and the reviewers 31, 32, . . . , and 3n may create and modify the documents on the server. The server may calculate the hash chains and create the signatures.

Although the embodiments are exemplified above, the configurations of the sections described in the embodiments may be replaced with other sections including the same functions as those of the sections described in the embodiments. Another arbitrary constituent component and another arbitrary process may be added. Arbitrary two or more of the configurations (features) described in the embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A verification method implemented by a first system including a plurality of computers, the method comprising:
   in response to an original document, calculating an original document's first hash value by using the original document;
   in response to the calculating of the first hash value, calculating an original document's second hash value by using the first hash value;
   in response to obtaining of a first modified version document modified from the original document, calculating a first modified version's first hash value by using the first modified version document;
   in response to the calculating of the first modified version's first hash value, calculating a first modified version's second hash value that is a hash value obtained by combining the first modified version's first hash value and the original document's second hash value;
   in response to obtaining of a second modified version document by modifying the first modified version document, calculating a second modified version's first hash value that is a hash value for the second modified version document;
   in response to the calculating of the second modified version's, calculating a second modified version's second hash value that is a hash value obtained by combining the second modified version's first hash value and the first modified version's second hash value; and
   transmitting information to a second computer system to cause the second computer to verify the validity of the second modified version's second hash value by using the information, the information including the original document's first hash value, the first modified version's first hash value, and the second modified version's first hash value.

2. The verification method according to claim 1, the method further comprising:
   creating a first signature for the original document by using a private key of a creator of the original document and the original document's second hash value;
   creating a second signature for the first modified version document by using a private key of a creator of the first modified version document and the first modified version's second hash value;
   creating a third signature for the second modified version document by using a private key of a creator of the second modified version document and the second modified version's second hash value; and
   transmitting the information to the second computer system to cause the second computer system to verify the validity of the first signature, the validity of the second signature, and the validity of the third signature by using the information including a public key of the creator of the original document, a public key of the creator of the first modified version document, a public key of the creator of the second modified version document, the original document's first hash value, the first modified version's first hash value, and the second modified version's first hash value.

3. The verification method according to claim 2, the method further comprising:
   creating an aggregate signature by aggregating the first signature, the second signature, and the third signature; and
   transmitting the information to the second computer system to cause the second computer system to verify the validity of the first signature, the validity of the second signature, and the validity of the third signature by using the information including the aggregate signature.

4. The verification method according to claim 1, wherein the first computer system is configured to calculate the original document's second hash value based on the original document's first hash value and a random number, and
   the second computer system is configured to use the random number, the original document's first hash value, the first modified version's first hash value, and the second modified version document to verify the validity of the second modified version's second hash value.

5. The verification method according to claim 1, wherein the second computer system is configured to use the second modified version document acquired from the first computer system to calculate the second modified version's first hash value and uses the calculated second modified version's first hash value, the original document's first hash value acquired from the first computer system, and the first modified version's first hash value acquired from the first computer system to verify the validity of the second modified version's second hash value.

6. The verification method according to claim 5, wherein
the calculating of the original document's first hash value is performed based on the original document and a first random number,
the calculating of the first modified version's first hash value is performed based on the first modified version document and a second random number,
the calculating of the second modified version's first hash value is performed based on the second modified version document and a third random number, and
the verifying of the validity of the second modified version's second hash value is configured to calculate the second modified version's first hash value by using the second modified version document acquired from the first computer system and the third random number acquired from the first computer system.

7. The verification method according to claim 6, the method further comprising:
causing the second computer system to use the first modified version document acquired from the first computer system and the second random number acquired from the first computer system to verify the validity of the first modified version's first hash value acquired from the first computer system.

8. A non-transitory computer-readable storage medium for storing a verification program which causes a first system including a plurality of computers to perform processing, the processing comprising:
in response to an original document, calculating an original document's first hash value by using the original document;
in response to the calculating of the first hash value, calculating an original document's second hash value by using the first hash value;
in response to obtaining of a first modified version document modified from the original document, calculating a first modified version's first hash value by using the first modified version document;
in response to the calculating of the first modified version's first hash value, calculating a first modified version's second hash value that is a hash value obtained by combining the first modified version's first hash value and the original document's second hash value;
in response to obtaining of a second modified version document by modifying the first modified version document, calculating a second modified version's first hash value that is a hash value for the second modified version document;
in response to the calculating of the second modified version's, calculating a second modified version's second hash value that is a hash value obtained by combining the second modified version's first hash value and the first modified version's second hash value; and
transmitting information to a second computer system to cause the second computer to verify the validity of the second modified version's second hash value by using the information, the information including the original document's first hash value, the first modified version's first hash value, and the second modified version's first hash value.

9. The non-transitory computer-readable storage medium according to claim 8, the processing further comprising:
creating a first signature for the original document by using a private key of a creator of the original document and the original document's second hash value;
creating a second signature for the first modified version document by using a private key of a creator of the first modified version document and the first modified version's second hash value; and
creating a third signature for the second modified version document by using a private key of a creator of the second modified version document and the second modified version's second hash value.

10. An information processing device comprising:
a memory; and
a processor circuit coupled to the memory, the processor circuit being configured to perform processing, the processing including:
in response to an original document, calculating an original document's first hash value by using the original document;
in response to the calculating of the first hash value, calculating an original document's second hash value by using the first hash value;
in response to obtaining of a first modified version document modified from the original document, calculating a first modified version's first hash value by using the first modified version document;
in response to the calculating of the first modified version's first hash value, calculating a first modified version's second hash value that is a hash value obtained by combining the first modified version's first hash value and the original document's second hash value;
in response to obtaining of a second modified version document by modifying the first modified version document, calculating a second modified version's first hash value that is a hash value for the second modified version document;
in response to the calculating of the second modified version's, calculating a second modified version's second hash value that is a hash value obtained by combining the second modified version's first hash value and the first modified version's second hash value; and
transmitting information to a second computer system to cause the second computer to verify the validity of the second modified version's second hash value by using the information, the information including the original document's first hash value, the first modified version's first hash value, and the second modified version's first hash value.

11. The information processing device according to claim 10, wherein the processing further includes:
creating a first signature for the original document by using a private key of a creator of the original document and the original document's second hash value;

creating a second signature for the first modified version document by using a private key of a creator of the first modified version document and the first modified version's second hash value;

creating a third signature for the second modified version document by using a private key of a creator of the second modified version document and the second modified version's second hash value; and transmitting the information to the second computer system to cause the second computer system to verify the validity of the first signature, the validity of the second signature, and the validity of the third signature by using the information including a public key of the creator of the original document, a public key of the creator of the first modified version document, a public key of the creator of the second modified version document, the original document's first hash value, the first modified version's first hash value, and the second modified version's first hash value.

\* \* \* \* \*